(12) United States Patent
Yuasa

(10) Patent No.: US 6,522,336 B1
(45) Date of Patent: Feb. 18, 2003

(54) THREE-DIMENSIONAL GRAPHICS RENDERING APPARATUS AND METHOD

(75) Inventor: Kei Yuasa, Tokyo (JP)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/530,327
(22) PCT Filed: Oct. 30, 1998
(86) PCT No.: PCT/US98/23163
§ 371 (c)(1), (2), (4) Date: Jul. 11, 2000
(87) PCT Pub. No.: WO99/23610
PCT Pub. Date: May 14, 1999

(30) Foreign Application Priority Data

Oct. 31, 1997 (JP) .............................................. 9-315877
Feb. 28, 1998 (JP) ............................................ 10-064665

(51) Int. Cl.⁷ ................................................. G09G 5/00
(52) U.S. Cl. ........................ 345/582; 345/428; 345/419
(58) Field of Search ................................ 345/582, 583, 345/587, 588, 606, 607, 419, 428

(56) References Cited

U.S. PATENT DOCUMENTS 5,490,240 A * 2/1996 Foran et al. ................ 345/582
5,596,687 A * 1/1997 Peters, Jr. ................... 345/582
6,304,268 B1 * 10/2001 Iourcha et al. .............. 345/582

OTHER PUBLICATIONS

"How VRML Works", Chapter 3, pp44–51, VRML Browsing & Building Cyberspace.
Rashwan, M. A. et al., "Pyramid Data Structures for On–Line Image Progressinve Transmission", IEEE, 1993, pp. 103–105.

* cited by examiner

Primary Examiner—Matthew Luu

(57) ABSTRACT

An image represented by color values corresponding to the pixels of a rendering screen is rendered in response to three-dimensional graphics data. The three-dimensional graphics data include polygon data and texture data. The texture data define a texture and include texture size data and pattern data. The pattern data represent multiple instances of the texture. Each instance has a different resolution. The pattern data constitute a significant majority of the texture data. The polygon data, the texture size data and the pattern data representing the lowest-resolution instance of the texture are initially loaded. An initial rasterizing operation is performed using the polygon and texture size data to generate and to store a texture identifier and texture coordinates for each pixel of the rendering screen. A display-and-load operation is repetitively performed until either the color values of all the pixels of the rendering screen are generated using different ones of the pattern data, or the pattern data of at least part of the highest-resolution instance of the texture have been loaded. In the display-and-load operation, the color values representing the image are generated using the pattern data of a highest-resolution instance of the texture previously loaded. In response to the texture coordinates stored for the rendering screen pixels, the pattern data of a next-higher resolution instance of the texture required to render at least pants of the image with a higher resolution are identified, and the identified pattern data are loaded.

20 Claims, 19 Drawing Sheets

| TI₁ | 11 | 1 ENTRY | | | TLL |
|---|---|---|---|---|---|
| TI₂ | 11 | 11 | 11 | 11 | 4 ENTRIES |
| TI₃ | 10 | 00 | 00 | 00 | 00 ... 00 | 16 ENTRIES |

←1→   ←—2—→   ←———4———→

| T(0) |
|---|

TI₁

| T(1) | T(2) |
|---|---|
| T(3) | T(4) |

TI₂

| T(5) | T(6) | T(7) | T(8) |
|---|---|---|---|
| T(9) | T(10) | T(11) | T(12) |
| T(13) | T(14) | T(15) | T(16) |
| T(17) | T(18) | T(19) | T(20) |

| T(0) |
|---|

TI₁

| T(1) | T(2) |
|---|---|

TI₂

| T(3) | T(4) | T(5) | T(6) |
|---|---|---|---|
| T(7) | T(8) | T(9) | T(10) |

| TEXTURE COORDINATES (p,q) | INSTANCE TI$_1$ COORDINATES (p$_1$,q$_1$) | INSTANCE TI$_2$ COORDINATES (p$_2$,q$_2$) | INSTANCE TI$_3$ COORDINATES (p$_3$,q$_3$) |
|---|---|---|---|
| (512, 256) → | (32, 16) → | (64, 32) ⎤ → | (128, 64) |
| (512, 264) → | (32, 16) → | (64, 32)  → | (128, 65) |
| (520, 264) → | (32, 16) → | (64, 32) ⎦ → | (129, 65) |
| (512, 272) → | (32, 17) → | (64, 33) ⎤ → | (128, 66) |
| (520, 272) → | (33, 17) → | (64, 33) ⎦ → | (129, 66) |
| (528, 272) → | (33, 17) → | (65, 33) → | (130, 66) |
| ⋮ | ⋮ | ⋮ | ⋮ |
| (768, 512) → | (48, 32) → | (96, 64) → | (192, 128) |

THREE-DIMENSIONAL GRAPHICS RENDERING APPARATUS AND METHOD

FIELD OF THE INVENTION

The invention relates to a three-dimensional graphics rendering apparatus and method that are ideal for rendering images of three-dimensional objects in response to three-dimensional graphics data transferred via a data rate-limited network such as the World Wide Web, or other data rate-limited medium. The invention relates in particular to a three-dimensional graphics rendering apparatus and method that substantially instantly generate a low-resolution version of the image of the three-dimensional object, and then successively re-generate versions of the image with progressively-increasing resolutions until a version of the image having optimum resolution is generated.

BACKGROUND OF THE INVENTION

With the spread of graphics programming languages such as VRML (Virtual Reality Modeling Language), three-dimensional graphics data data representing three-dimensional graphics can easily be transmitted via networks such as the Internet.

Three-dimensional graphics data (3D graphics data) typically include polygon data and color data. The polygon data indicate the positions of the vertices of polygons defining the surfaces of three-dimensional objects (3D objects) located in a virtual three-dimensional space (3D space). The appearance of each polygon can be defined by one of two types of data, direct color data and texture data. Direct color data indicate a color value assigned to the polygon. Texture data define the texture color values of the pixels of a texture pasted onto the polygon.

In three-dimensional graphics processing, each 3D object in 3D space is projected onto a hypothetical two-dimensional surface in a manner that corresponds to the distance and angle between a hypothetical point and the 3D object. In this disclosure, the hypothetical two-dimensional surface will be called a rendering screen, and the hypothetical point will be called a viewpoint. Then, hidden surface removal is performed so that color values are assigned only to the parts of the 3D object visible from the view point. Furthermore, when needed, the color values of the parts of the 3D object visible from the view point may be modified using intensity coefficients that take account of the position and intensity of one or more light sources.

The direct color data assigned to a polygon are usually composed of three color values, one for each of the three primary additive colors, red, green and blue. Red, green and blue will be abbreviated as R, G and B. Similarly, the texture data defining a pixel of a texture pasted onto one or more polygons is usually composed of three color values, one for each of the three primary additive colors, red, green and blue. Color values for different colors, such as yellow, cyan, magenta and black, can alternatively be used. Moreover, other ways of expressing the appearance of an object, such a luminance and color difference values, can alternatively be used as the color values.

If direct color data assigned to polygons are used to define the color to the surfaces of the 3D object, the direct color data define only one color for each polygon. Therefore, when the surface of the 3D object has a complex appearance, even though its topology may be simple, the surface of the object must be divided into many small polygons to enable its appearance to be defined accurately. Increasing the number of polygons means that very many data are involved in the geometry calculations. This significantly reduces the rendering speed.

Textures are used to overcome the problem just described. A texture can be used to define the appearance of the entire surfaces of a 3D object, or large portions of such surfaces. A texture is normally a bitmapped image of the appearance of the surface, and is pasted onto the surface of the polygon. A texture can define the appearance of the surface of the object in fine detail using a relatively small amount of data. A texture can not only define the appearance of repetitive patterns such as brick walls or marble pillars using only a few polygons but can also define an image or a part of an image applied to the surface of the object.

When a texture is pasted onto a polygon, the texture data defining the appearance of the texture must be transformed to correspond to the distance and angle between the view point and the polygon. Normally, this transformation is performed by specifying the coordinates of the vertices of the polygon and by additionally specifying one or more coordinate transform matrices.

Using textures to define the appearance of an object using even conventional rendering techniques provides the advantage of being able to define complex patterns on the surfaces of 3D objects using a small number of polygons as described above. However, the texture data may constitute a substantial number of data, especially when the textures are complex.

When 3D graphics data including texture data are loaded from a server to a client computer through a network, the user may have to wait before an image is displayed. In particular, when 3D graphics processing is performed in a conventional network environment, all of the 3D graphics data, i.e., the polygon data and color data, which include the texture data, must be loaded before any of the rendering calculations start. The time required to load the 3D graphics data may be inconveniently long when the appearance of the 3D objects is defined by complex textures, and a large number of texture data must be downloaded to define the textures. As a result, the latency period, during which nothing is displayed on the screen, may be unacceptably long, and fast rendering is impossible.

Techniques are known for providing two-dimensional graphics data in a special format that enables normal two-dimensional graphics images to be rendered at progressively higher resolutions. In other words, a low-resolution image is initially displayed. The image is then sequentially re-displayed in progressively finer resolutions. One of these display techniques is sold under the trademark FLASHPIX and will be described in more detail below.

However, conventional techniques for rendering images in response to two-dimensional graphics data cannot be applied without modification when textures are mapped onto polygons to represent three-dimensional objects. This is because the textures must be transformed in accordance with the positions of one or more light sources and to take account of the orientation of the polygon relative to the view point, as described above.

Accordingly, what is needed is a three-dimensional graphics rendering apparatus and method capable of rendering an image of a 3D object in a 3D space at high speed and with a resolution that is optimized for each part of the 3D object.

What is also needed is a three-dimensional graphics rendering apparatus and method capable of immediately and rapidly rendering a low-resolution image of the 3D-object and, particularly in a network environment, capable of sequentially re-displaying the image of the 3D-object in progressively finer resolutions as the display time elapses.

Finally, what is needed is a three-dimensional graphics rendering apparatus and method capable of providing effective use of various computational resources by more efficiently loading the texture data related to the actual resolutions in which the various parts of the image are displayed.

SUMMARY OF THE INVENTION

The rendering apparatus according to the invention renders an image in response to three-dimensional graphics data, and comprises a data input path, a reference buffer and a rendering engine. The rendering apparatus receives the three-dimensional graphics data through the data input path. The three-dimensional graphics data include polygon data and texture data. The texture data define a texture and include texture size data and pattern data. The pattern data represent multiple instances of the texture. Each instance has a different resolution. The pattern data constitute a significant majority of the texture data. The rendering apparatus initially receives no more than the polygon data, the texture size data and the pattern data representing the lowest-resolution instance of the texture via the data input path.

The reference buffer includes memory cells corresponding to the pixels of a rendering screen.

The rendering engine performs an initial rasterizing operation using only the polygon and texture size data to generate and store in each of the memory cells of the reference buffer texture coordinates for a corresponding one of the pixels of the rendering screen. The rendering engine additionally repetitively performs a display-and-load operation until either color values of all the pixels of the rendering screen are generated using different ones of the pattern data then extant in the rendering apparatus, or the pattern data representing at least part of the highest-resolution instance of the texture have been loaded. In the display-and-load operation, the rendering engine generates color values, identifies the pattern data of a next-higher resolution instance of the texture required to render at least parts of the image with a higher resolution, and causes the pattern data identified as being required to render the at least parts of the image with the higher resolution to be loaded via the path. The rendering engine generates the color values using the pattern data of the highest-resolution instance of the texture then extant in the rendering apparatus. The rendering engine identifies the pattern data of the next-higher resolution instance of the texture in response to the texture coordinates stored in the reference buffer.

The rendering apparatus may additionally comprise a texture memory in which the pattern data loaded via the data input path are stored in a pyramidal data structure. The pyramidal data structure includes layers in which are stored the pattern data of respective ones of the instances of the texture.

The invention also provides a method of rendering an image represented by color values corresponding to pixels of a rendering screen in response to three-dimensional graphics data. The three-dimensional graphics data include polygon data and texture data. The texture data define a texture and include texture size data and pattern data. The pattern data represent multiple instances of the texture. Each instance has a different resolution. The pattern data constitute a significant majority of the texture data. In the method, the polygon data, the texture size data and the pattern data representing the lowest-resolution instance of the texture are initially loaded. An initial rasterizing operation is performed using the polygon data and texture size data to generate and to store a texture identifier and texture coordinates for each pixel of the rendering screen. A display-and-load operation is repetitively performed until either the color values of all the pixels of the rendering screen are generated using different ones of the pattern data, or the pattern data of at least part of the highest-resolution instance of the texture have been loaded. In the display-and-load operation, the color values representing the image are generated using the pattern data of a highest-resolution instance of the texture previously loaded. In response to the texture coordinates stored for the rendering screen pixels, the pattern data of a next-higher resolution instance of the texture required to render at least parts of the image with a higher resolution are identified, and the identified pattern data are loaded.

By only initially loading the polygon data, the texture size data and the pattern data representing the lowest-resolution instance of the texture, the apparatus and method according to the invention generate the image data representing a low-resolution versions of the image with substantially no delay. The image data representing higher-resolution versions of the image are subsequently generated. However, the image data representing the higher-resolution versions of the image may be generated more rapidly than by a conventional apparatus or method because the apparatus and method according to the invention load only the pattern data required to generate the image data that represent the image with optimum resolution. Thus, the pattern data for those parts of the image that do not need the higher-resolution instances of the texture to be rendered with optimum resolution are not loaded.

BRIEF DESCRIPTION OF THE DRAWINGS

FIG. 6A shows how the pattern data representing the instances of a texture are arranged into tiles when the texture has a square aspect ratio.

FIG. 6B shows how the pattern data representing the instance of a texture are arranged into tiles when the texture has a rectangular aspect.

DETAILED DESCRIPTION OF THE INVENTION

The invention relates to a three-dimensional graphics rendering apparatus and method intended for use in an environment in which the data transfer rate of the 3D graphics data is limited, as in a network such as the Internet. The three-dimensional graphics rendering apparatus and method render a two-dimensional image of a 3D space populated by 3D objects. The image is of the 3D space from a view point chosen by the user or defined by the 3D graphics data. The 3D space may additionally be illuminated by one or more sources of illumination also chosen by the user or defined by the 3D graphics data. A hypothetical rendering screen located between the view point and the 3D space defines the direction and field of view that the image will represent. The rendering screen is divided into picture elements (pixels) in an arrangement that preferably corresponds to the number of pixels used to display the image. For example, if the image is to be displayed on the screen of an SVGA monitor, the rendering screen is preferably divided into 800×600 pixels.

The three-dimensional rendering apparatus and method calculate a set of color values for each of the pixels of the rendering screen. Each set of color values may include a red color value, a green color value and a blue color value, for example. Alternatively, the set of color values may include a luminance value and two color difference values, or color values for colors other than red, green and blue. For display by a monochrome display, each set of color values may be composed of a single luminance value. The image is then displayed in response to the color values.

Figure 1:
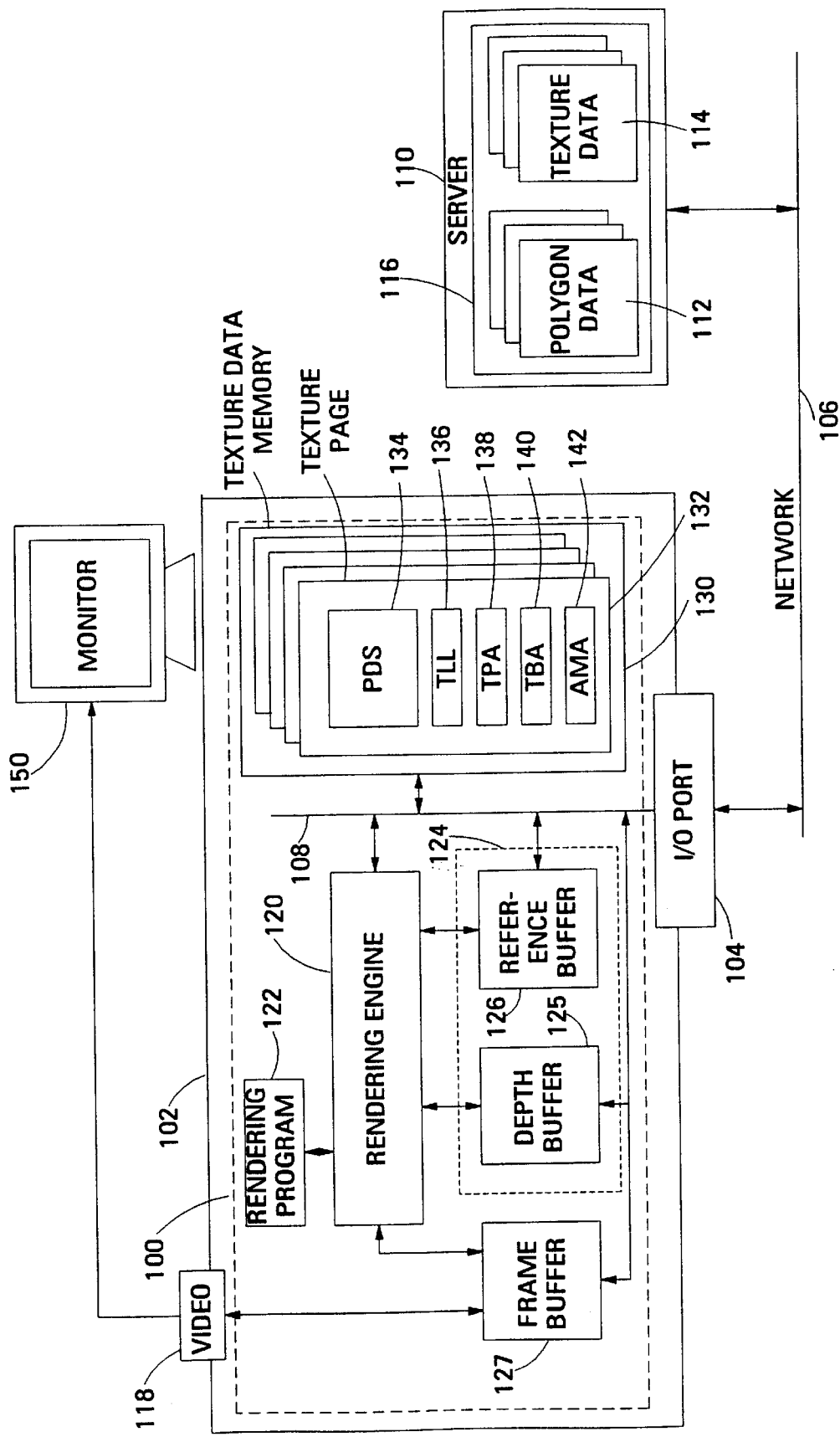
FIG. 1 is a block diagram of the three-dimensional graphics rendering apparatus according to the invention located in a client computer connected through a network to a server.

FIG. 1 is a block diagram of the rendering apparatus 100 according to the invention. The rendering apparatus resides in the computer 102, for example. In a practical embodiment, the rendering apparatus may form part of a graphics card (not shown) located in the computer. Alternatively, the rendering apparatus may be a hardware accessory that plugs into or is otherwise connected to the graphics card of the computer. As a further alternative, the existing hardware of the computer, operating in response to the rendering program, may serve as the rendering engine.

The computer 102 is shown connected via the I/O port 104 as a client of the network 106. The I/O port is connected directly or indirectly to the bus 108 to which other elements of the rendering apparatus and the computer are connected. Also connected to the network 106 is the server 110 that includes the 3D graphics data memory 116 that stores 3D graphics data. The 3D graphics data memory includes the polygon data memory 112 and the texture data memory 114.

The polygon data memory 112 stores polygon data that define the topology of the surfaces of the 3D objects. The polygon data define the positions of the vertices of the polygons in 3D space, and additionally include either direct color data for the polygon or the name or an address of the texture applied to the polygon.

The texture data memory 114 stores texture data that define the textures applied to all or part of one or more of the surfaces of one or more of the 3D objects. Pattern data defining the appearance of each texture constitute a significant majority of the texture data. The texture data also include, for each texture, the texture height H, the texture width W, layer data specifying the number of instances of the texture for which pattern data are available, and the tile width TW and tile height TH of the tiles into which the instances of the texture are divided. Each instance of the texture has a different resolution, as will be described in more detail below.

Additionally or alternatively, the 3D graphics data may be stored in the computer 102. In this case, storage sections equivalent to the memories 112 and 114 are located in a memory (not shown) located in the computer and connected directly or indirectly to the bus 108. For example, 3D graphics data loaded from the server 110 may be cached in the computer. In the rendering apparatus 100, the rendering engine 120 is connected to the bus 108. The rendering engine executes the rendering program 122 to perform rendering operations in response to the 3D graphics data. Each rendering operation generates a set of color values in response to which the two-dimensional image is displayed. The rendering engine performs the method according to the invention. The rendering engine may be constructed using a microprocessor, a digital signal processor, one or more application-specific integrated circuits or general purpose integrated circuits and may include other elements such as read-only and random-access memories (not shown) that enable it to perform the processing described herein.

The rendering apparatus 100 additionally includes the texture mapping buffer 124 composed of the depth buffer 125 and the reference buffer 126. The depth buffer and the reference buffer are preferably connected to the rendering engine 120 through the bus 108. The rendering apparatus uses the reference buffer 126 to store intermediate results generated by initial rasterizing calculations performed by the rendering engine 120, as will be described in detail below. Also connected to the rendering engine by the bus is the frame buffer 127. The frame buffer has an output connected to the video output port 118 through which a video signal derived from the color values generated by the rendering apparatus 100 is fed to the monitor 150 to display the image.

The depth buffer 125, the reference buffer 126, and the frame buffer 127 are preferably each composed of multiple storage cells each of which is capable of storing several bytes of data. Preferably, each of the cells corresponds to one pixel of the rendering plane. However, the buffers may include additional storage cells to provide the option of rendering higher-resolution images. Moreover, a subset of the cells of these buffers can be used in the event that, for example, lower-resolution images are rendered, or images smaller than full screen are rendered.

The rendering apparatus 100 also includes the texture data memory 130 connected to the bus 108. The texture data memory is partitioned into multiple pages. An exemplary one of the pages is identified by the reference numeral 132. The texture data of one texture are stored in each page. Each page is divided into sections in which subsets of the texture data defining the texture are stored. In the example shown in FIG. 1, the page 132 includes the pattern data store (PDS) 134, the tile load list (TLL) 136, the tile pitch array (TPA) 138, the tile base array (TBA) 140 and the access map array (AMA) 142. The other pages of the texture data memory are similarly structured.

Briefly, the pattern data representing a number of instances of the texture, each having a different resolution, are stored in the pattern data store 134. The tile load list 136 includes an entry for each tile into which the texture is divided. The entry indicates the acquisition status of the pattern data of the tile, i.e., whether the pattern data of the tile need to be loaded to render the image, and whether the pattern data have been loaded or not. The tile pitch array 138 and the tile base array 140 each include an entry for each instance of the texture. The entries respectively indicate the number of tiles arrayed across the width of the instance of the texture and the tile number of the first tile in the instance of the texture. The access map array 142 includes an access map for each tile of the most recently loaded instance of the texture. Each access map includes a one-bit entry for each texture pixel of the tile. The access map is used to determine whether the pattern data of the respective tile of the texture are capable of rendering the image with optimum resolution. The texture data stored in each page of the texture memory will be described in more detail below.

Figure 2:
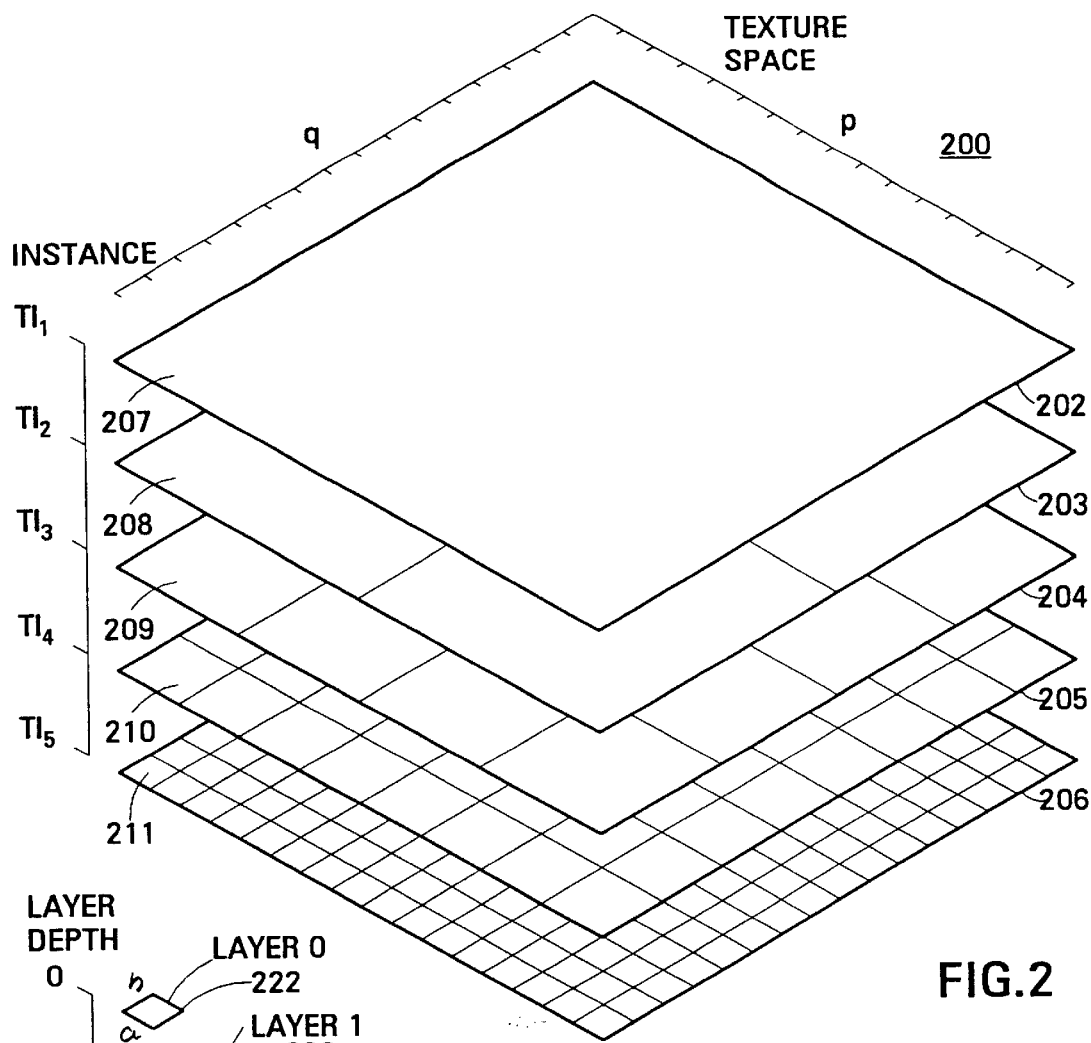
FIG. 2 shows a two-dimensional texture space in which instances of a texture each having a different resolution are defined with the same dimensions.

As noted above, the texture data of a texture include pattern data representing multiple instances of the texture, each with a different resolution. FIG. 2 shows how the instances 202, 203, 204, 205, 206 of the texture 200 each have the same dimensions in the 2-dimensional texture space shown. In this example, five instances of the texture are shown. A given texture can have more or fewer instances. The instances are numbered using the instance number k, with the lowest-resolution instance having an instance number of one. This example also shows the texture space coordinates (p, q) that have discrete values corresponding to the texture pixels of the original instance 206 of the texture.

Each instance of the texture is divided into tiles. The bottom, left-hand tile of each of the instances 202–206 is indicated by the reference numerals 207–211, respectively. Because each instance is composed of a different number of texture pixels, and the tiles are all composed of the same number of texture pixels, each instance of the texture is divided into a different number of tiles. FIG. 2 shows an exemplary texture having a square aspect ratio in which the lowest-resolution instance 202 is divided into a single ($4^0$) tile, the next-higher resolution instance 203 is divided into four ($4^1$) tiles, the next-higher resolution instance 204 is divided into sixteen ($4^2$) tiles, and the k-th instance is divided into $4^{k-1}$ tiles, etc. The original resolution instance 206 in this example is divided into $4^4$ tiles. The texture pixels are not shown in FIG. 2 to simplify the drawing.

As noted above, all of the tiles are composed of the same number of texture pixels in all of the instances 202–206 of the texture. For example, the tiles may each be composed of a two-dimensional array of 64×64 texture pixels. Since the number of texture pixels in the instances increases exponentially as the layer depth of the instance increases from 0 to 4, each texture pixel represents an exponentially-decreasing portion of the texture space. Accordingly, the resolution with which each of the instances represents the texture increases as the layer depth of the instance increases. The way of representing the multiple instances of the texture in the invention differs from conventional ways of representing multiple instances of an image in that the lowest-resolution instance 202 of the texture is composed of more than one texture pixel.

The tiles into which the instances 202–206 of the texture are divided are each assigned a tile number t (where t=0, 1, . . . , ). In the example shown, the ranges of the tile numbers of the tiles in the different instances are as set forth in Table 0 below:

TABLE 0

| Layer Depth | Tile Number Range |
|---|---|
| 0 | 0 |
| 1 | 1–4 |
| 2 | 5–20 |
| 3 | 21–84 |
| 4 | 85–340 |

Figure 3:
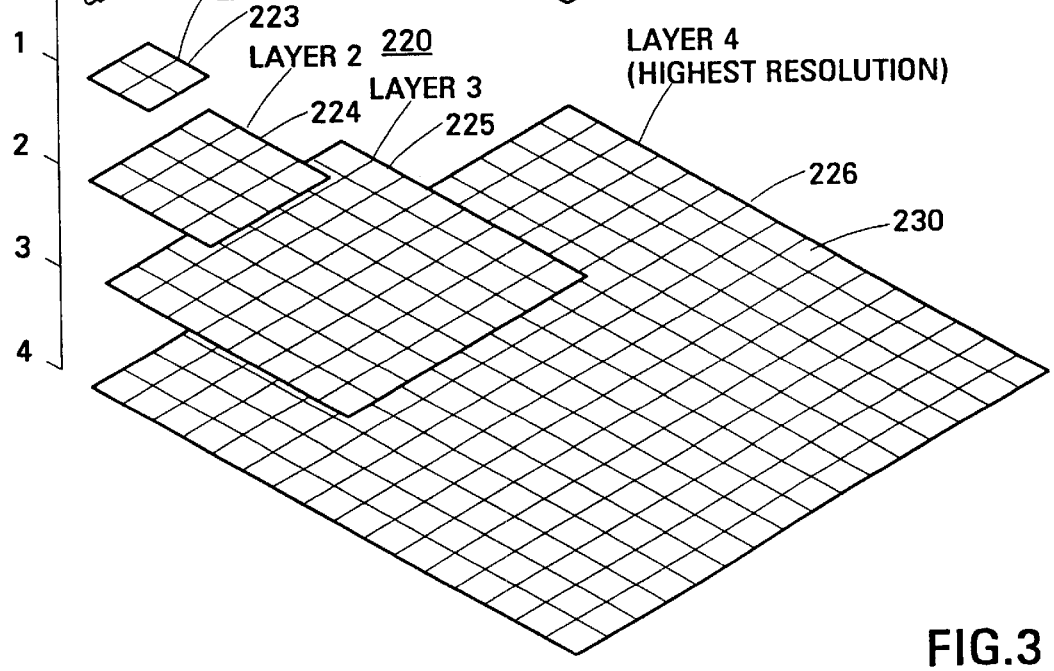
FIG. 3 shows the structure of the pyramidal data structure used in the rendering apparatus and method according to the invention to store the pattern data of each texture.

FIG. 3 shows the structure of the pyramidal data structure 220 in which the pattern data representing the different instances of each texture are stored in the pattern data store 134 in the respective page 132 of the texture data memory 130 of the rendering apparatus 100 shown in FIG. 1. The multi-resolution pyramidal data structure is based on the conventional two-dimensional graphics system sold under the trademark FLASHPIX, which uses a pyramidal data structure to store data representing two-dimensional images such as photographs and the like.

In the rendering apparatus and method according to the invention, the pattern data of each instance of the texture are stored in a pyramidal data structure in which the pattern data for each instance are arranged in a different layer corresponding to the layer depth of the instance. The layers are numbered from the top layer down, the top layer being layer zero. The position of a layer in the pyramidal structure is described by the layer depth of the layer. The top layer, in which the pattern data of the lowest-resolution instance are stored, has a layer depth of zero. The layer depth of the layer in which the pattern data of the highest-resolution instance of the texture are stored in the example shown in FIG. 3 is four. However, the pyramidal data structure may include more or fewer layers than the number shown in this example, depending on the size of the texture.

The pattern data in each of the layers of the pyramidal data structure 220 are the pattern data of one instance of the texture. The instance of the texture represented by the pattern data in each layer has a linear resolution in each direction of one half of that of the instance of the texture represented by the pattern data in the next-lower layer and twice that of the instance of the texture represented by the pattern data stored in the next-higher layer, as described above with reference to FIG. 2.

The pattern data that represent the highest-resolution instance of the texture constitute the bottom layer 226 of the pyramidal data structure 220. Normally, the highest resolution is the same as the original resolution of the texture. However, if the original resolution is higher than the maximum resolution needed for the application, the highest resolution may be less than the original resolution. The pattern data of four adjacent texture pixels in the bottom layer are combined to generate the pattern data of one texture pixel in the layer 225 immediately above the bottom layer. Consequently, the pattern data in the layer 225 represent an instance of the texture with a linear resolution in each direction of one-half that of the instance of the texture represented by the pattern data of the bottom layer. The number of pattern data in the layer 225 is one-quarter of the number of pattern data in the bottom layer. The combining process described above is performed to generate the pattern data in each of the remaining layers 224–222 from the pattern data in the layer immediately below.

In the top layer 222 of the pyramidal data structure 220, the texture is represented by the pattern data of an array of a texture pixels in the horizontal direction and b texture pixels in the vertical direction. In one practical embodiment, a=b=64. It should be noted that the pyramidal data structure 220 differs from a conventional pyramidal data structure such as the MIP data structure. In the pyramidal data structure 220, the pattern data of one tile constitutes the top layer. In a conventional pyramidal data structure, the pattern data of one texture pixel constitutes the top layer.

Each layer of the pyramidal data structure 220 below the top layer 222 is divided into square or rectangular tiles, each composed of an array of a×b texture pixels. An exemplary tile in the bottom layer 226 is shown at 230. The tile is the unit in which the pattern data are loaded from the server 110 or from a memory (not shown) located in the client computer 102, as described above. Each layer of the pyramidal data structure is divided into $4^D$ tiles, where D is the layer depth of the layer and the top layer 222 has a layer depth of 0.

The pattern data in each of the layers 222–226 of the pyramidal data structure normally constitute an image map representing the texture. However, when the pattern data are transferred to the rendering apparatus 100 through the network 106, for example, the image map data may be compressed to reduce the transmission time. For example, JPEG compression may be used to compress the image map data to generate the pattern data for transmission. However, the compressed pattern data are expanded to image-map form before being stored in the pyramidal data structure.

The rendering apparatus and method according to the invention renders each part of a 3D object at high speed and at an appropriate resolution. In addition, the rendering apparatus and method immediately render the 3D object as a low resolution image with almost no waiting time. Particularly, in a network environment, at least part of the 3D object is rendered at progressively higher resolutions as the display time elapses. Furthermore, the rendering apparatus and method efficiently load the texture data related only to the visible parts of the object. This provides a significant reduction in the number of pattern data that needs to be loaded to render the image.

Finally, the rendering apparatus and method render the image with optimum resolution. The rendering apparatus and method are capable of rendering all parts of the image with a resolution corresponding to that of the highest-resolution texture. However, when the image is rendered with optimum resolution, parts of the image that do not have to be rendered at a resolution corresponding to the highest resolution instance of the texture are rendered at a lower resolution. The parts of the image that can be rendered at a lower resolution include those that correspond to polygons that are small in size, or are distant from the view point or are at an angle to the rendering screen. Rendering the image with optimum resolution reduces the number of pattern data that need to be loaded from the server 110, and reduces the time required to render the image. In this disclosure, references to rendering the image with optimum resolution will be taken to refer to rendering the image in a way that all parts of the image are not necessarily rendered with a resolution corresponding to that of the highest-resolution instance of the texture.

The pattern data that need to be loaded from the server 110 to render the image with optimum resolution are identified by the access map array 142 located in each page 132 of the texture data memory 130. The access map array includes an access map for each tile into which the texture is divided. Each access map includes an entry for each texture pixel of the tile. The access map is used to identify the instance of the texture whose pattern data can be used to calculate the color values of each of the pixels of the rendering screen with optimum resolution. When the pattern data of one of the texture pixels of a tile of an instance of the texture are used to calculate the color values of more than one pixel of the rendering screen, this indicates that the pattern data of the corresponding tile in the instance of the texture having one level higher resolution need to be loaded to render the image with a higher resolution. This causes the tile's entry in the tile load list 136 in the texture's page 132 of the texture data memory 130 to be changed to a state that indicates that the pattern data of the tile must be loaded. The process by which the pattern data required to render each part of the image with optimum resolution are sequentially loaded will be described below with reference to FIGS. 7A and 7B.

Figure 4:
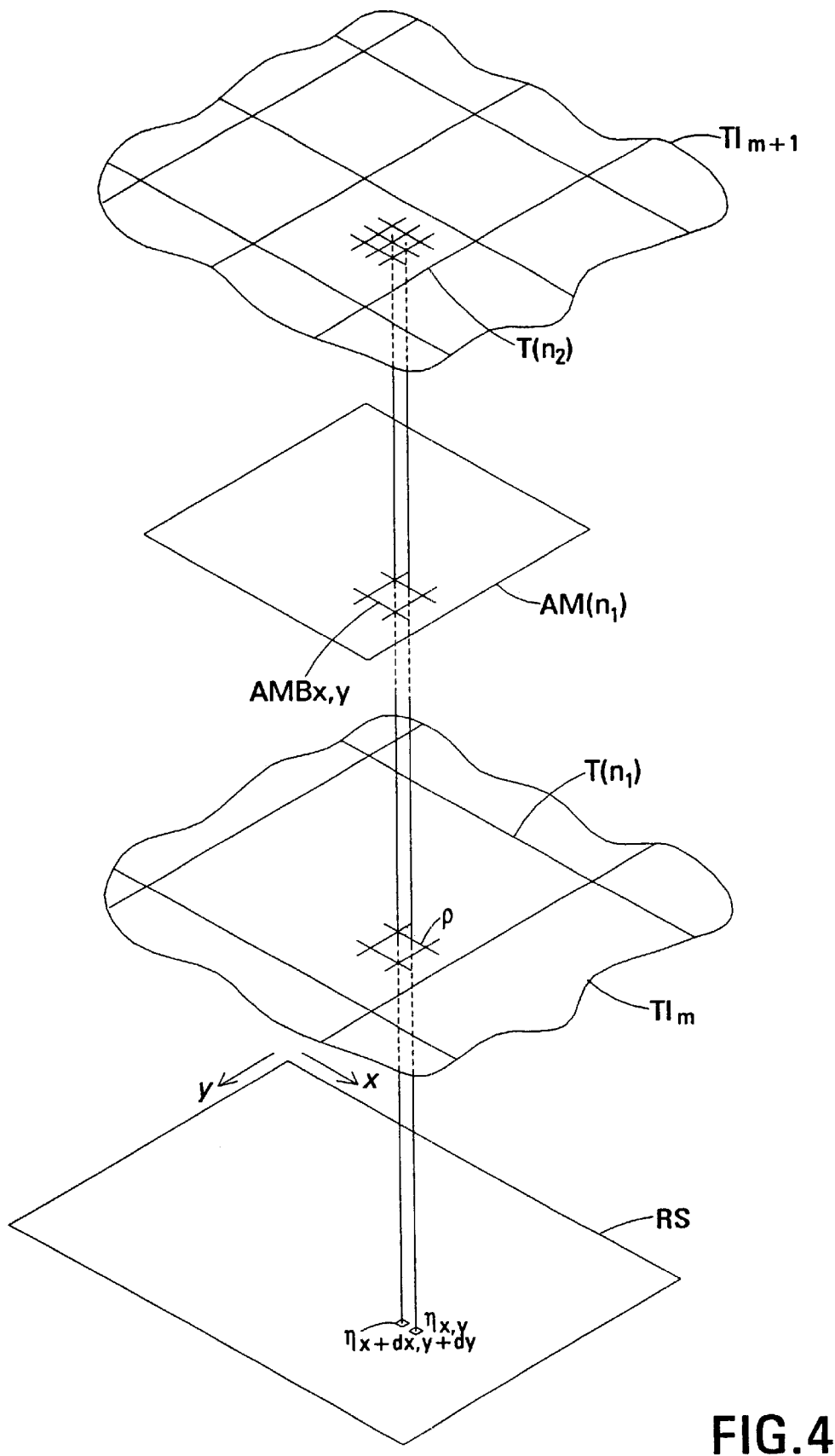
FIG. 4 shows an example of the access map used in the rendering apparatus and method according to the invention to determine the instance of the texture whose pattern data are used to generate the color values of each pixel of the rendering screen.

FIG. 4 shows the relationship between the pixels of the rendering screen RS whose color values are stored in the frame buffer 127, two instances $TI_m$ and $TI_{m+1}$ of the texture, and the access map $AM(n_1)$ of the tile $T(n_1)$ of the instance $TI_m$ of the texture. As described above with reference to FIG. 2, each instance of the texture is divided into a number of tiles. The pattern data representing each of the tiles are loaded as a unit. When the pattern data of a tile are loaded, all entries in the access map of the tile are set to the same state, a 0 in this example.

In this example, when the rendering engine 120 determines that the pattern data of the texture pixel p located in the tile $T(n_1)$ of the instance $TI_m$ of the texture are required to calculate the color values of the pixel $\eta_{x,y}$ of the rendering screen RS, it tests the state of the entry $AMB_{x,y}$ in the access map $AM(n_1)$ for the texture pixel p of the tile $T(n_1)$. The state of the entry indicates whether or not the pattern data of the pixel p of the tile $T(n_1)$ have been used previously to calculate the color values of another pixel of the rendering screen. After testing the state of the entry, the rendering engine sets the state of the entry to 1, indicating that the pattern data of the texture pixel p have been used to calculate the color values of a pixel of the rendering screen. In the above-mentioned test, if the state of the access map entry for the texture pixel p indicates that the pattern data of the texture pixel p of the tile $T(n_1)$ have been used previously to calculate the color values of another pixel of the rendering screen, the nearby pixel $\eta_{x+dx,y+dy}$, in this example, this indicates that the portion of the image near the rendering screen pixels $\eta_{x,y}$ and $\eta_{x+dx,y+dy}$ can be rendered with a resolution closer optimum resolution using the pattern data of an instance of the texture having a higher resolution, i.e., the instance $TI_{m+1}$. Accordingly, the rendering engine 120 sets the tile load list entry for the tile $T(n_2)$ of the next-higher instance $TI_{m+1}$ of the texture a state indicating that the pattern data of the tile must be loaded.

Later, after the pattern data of the tile $T(n_2)$ of the next-higher resolution instance $TI_{m+1}$ of the texture have been loaded, and the pattern data of this tile are used to calculate the color values of the rendering screen pixels, the access map for this tile may indicate that color values of the rendering screen pixels $\eta_{x,y}$ and $\eta_{x+dx,y+dy}$ can be calculated using the pattern data of different texture pixels of the texture. This will result in this part of the image being rendered with optimum resolution. However, if the access map of the tile $T(n_2)$ indicates that the pattern data of the same texture pixel of the higher-resolution instance $TI_{m+2}$ of the texture are still used to calculate the color values of the rendering screen pixels $\eta_{x,y}$ and $\eta_{x+dx,y+dy}$, the pattern data of at least one even higher resolution instance, e.g., $TI_{m+2}, TI_{m+3}, \ldots$, of the texture must be loaded to calculate the color values of these rendering screen pixels with optimum resolution.

When the pattern data of the tile $T(n_2)$ of the next-higher resolution instance $TI_{m+1}$ of the texture already exist in the pattern data store 134, as indicated by the state of the entry in the tile load list 136 for this tile, these pattern data can be used to calculate the color values of the rendering screen pixels $\eta_{x,y}$ and $\eta_{x+dx,y+dy}$. When the tile load list indicates that the pattern data of the tile $T(n_2)$ of the next-higher instance $TI_{m+1}$ of the texture do not exist in the pattern data store, the pattern data of the tile must be loaded from the texture data memory 114 in the server 110.

Figures 5, 8:
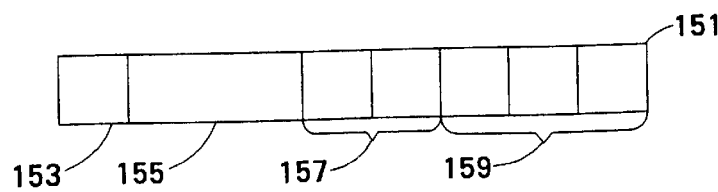
FIG. 5 shows an example of the tile load list used in the rendering apparatus and method according to the invention to control the loading of the pattern data.
FIG. 8 shows the structure of an exemplary cell of the reference buffer.

An example of the tile load list TLL is shown in FIG. 5. As noted above, the tile load list includes an entry for each of the tiles into which the different instances of the texture are divided. The entry indicates the status of the pattern data of the tile, i.e., whether the pattern data of the tile are required to render the image and whether the pattern data of the tile have been loaded. When the access map indicates that the pattern data of a tile of the next-higher instance of the texture are required to render the image, the rendering engine 120 sets the entry in the tile load list for the tile (the tile $T(n_2)$ in the example shown in FIG. 4) corresponding to the rendering screen pixels $\eta_{x,y}$ and $\eta_{x+dx,y+dy}$ of the instance $T_{m+1}$ of the texture to a state that indicates that the pattern data of the tile should be loaded next time a loading operation is performed. The pattern data of the tile $T(n_2)$ corresponding to the tile load list entry are loaded from the texture data store 114 of the server 110 described above.

In the example shown FIG. 5, each entry in the tile load list TLL is structured so that the status of the pattern data of the corresponding tile is indicated by a two-bit code. For example, all entries in the tile load list may initially be set to 00, indicating that the pattern data of the corresponding tile are not required to render the image and have not been loaded. When the access map of a tile indicates that the pattern data of the tile are required to render the image, the tile's entry in the tile load list can be set to 10, indicating that the pattern data of the tile are required, but have not yet been loaded. When a pattern data loading operation is performed, the pattern data of the tiles whose tile load list entries are set to 10 are loaded. The pattern data loading operation sets the tile load list entries whose the pattern data have been loaded to 11, indicating that the pattern data of the tile have been loaded and now exist in the location corresponding to the tile in the pyramidal data structure 134 in the texture's page 132 of the texture data memory 130. The tile load list entries are preferably arranged in the order of the tile numbers, beginning with the those of the lowest-resolution instances $TI_1$, $TI_{12} \ldots$ of the texture. In the example shown in FIG. 5, the entry of the single tile constituting the instance $TI_1$ of the texture and the entries of the four tiles constituting the instance $TI_2$ of the texture are set to 11 (loaded). Of the entries of the sixteen tiles constituting the instance $TI_3$ of the texture, the entry for the first tile is set to 10 (required, but not loaded), and the entries of the remaining tiles remain set to 00 (not loaded, not required).

The process of loading the pattern data from the server 110 is performed iteratively, so that the pattern data of the tiles of the instance $TI_{m+2}$ of the texture having one level higher resolution than the instance $TI_{m+1}$ are processed in the same way as described above. This enables the image to be displayed with a progressively higher resolution Operation of a preferred embodiments of the 3-dimensional graphics rendering apparatus according to the invention will now be described with reference to FIGS. 1 through 12.

The rendering engine 120 operates in response to the rendering program 122 to perform the processes that will be described below to generate the color values defining the image. The rendering engine generates the color values from the polygon data and selected ones of the texture data that collectively constitute the 3D graphics data.

FIG. 6A shows the tile numbers t of the tiles of the instances $TI_1$ through $TI_3$ of the texture 200 shown in FIG. 2. For each instance shown in FIG. 6A, Table 1 shows the layer depth D, the total number of tiles $N_{tile}$ constituting the instance, the tile pitch $T_p$ and the tile base $T_b$. The tile pitch is the number of tiles arrayed in the horizontal direction of the instance. The tile base is the tile number of the lowest-numbered tile of the instance. The lowest-numbered tile usually corresponds to the tile number of the top, left-hand tile of the instance.

TABLE 1

| Instance (FIG. 6A) | $TI_1$ | $TI_2$ | $TI_3$ |
|---|---|---|---|
| Layer depth D | 0 | 1 | 2 |
| total no. of tiles $N_{tiles}$ | 1 | 4 | 16 |
| tile pitch $T_p$ | 1 | 2 | 4 |
| tile base $T_b$ | 0 | 1 | 5 |

In the example shown FIG. 6A, the tiles constituting the instances $T_1$ through $TI_3$ of the texture are square, and have equal numbers of texture pixels in the vertical and horizontal directions. However, the tiles can be rectangular instead of square. FIG. 6B shows an example in which the instances are composed of tiles whose number of texture pixels in the vertical direction is one half of the number of texture pixels in the horizontal direction. For each instance shown in FIG. 6B, Table 2 shows the layer depth D, the total number of tiles $N_{tile}$ constituting the instance, the tile pitch $T_p$ and the tile base $T_b$.

TABLE 2

| Instance (FIG. 6B) | $TI_1$ | $TI_2$ | $TI_3$ |
|---|---|---|---|
| Layer depth D | 0 | 1 | 2 |
| total no. of tiles $N_{tiles}$ | 1 | 2 | 8 |
| tile pitch $T_p$ | 1 | 2 | 4 |
| tile base $T_b$ | 0 | 1 | 3 |

In this embodiment, the pattern data P of a texture pixel located in the tile T(t) of an instance of a texture are read by specifying the tile number (t) and the pixel coordinates (X, Y) in the tile. The texture pixel at the X-th position in the horizontal direction and the Y-th position in the vertical direction in the tile T(t) is specified by the tile number (t) and the tile coordinates (X, Y), i.e., (t: X, Y), and the pattern data of the texture pixel are represented by P(t:X, Y).

Figure 7A:
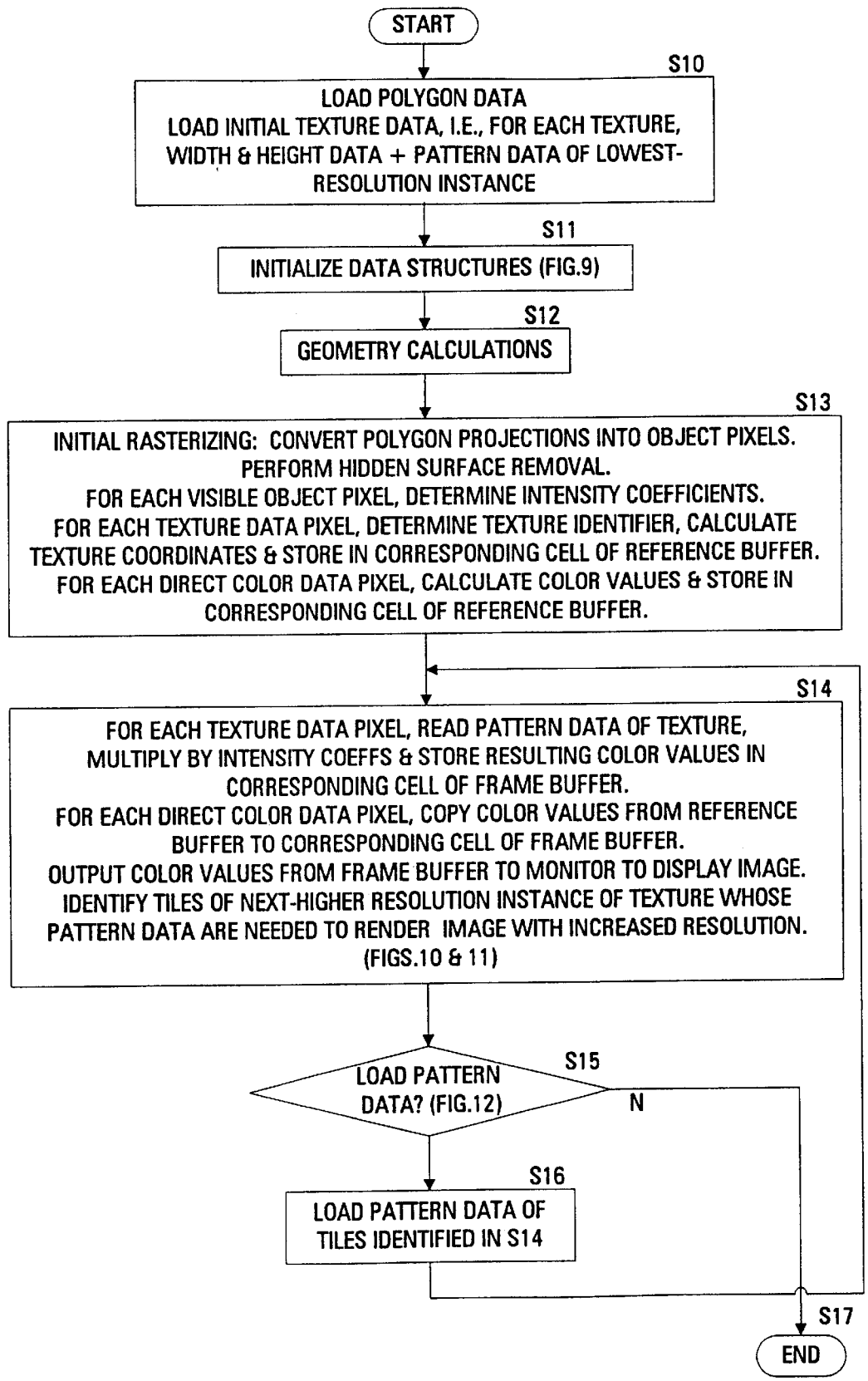
FIG. 7A is a flow chart illustrating one embodiment of the main graphics rendering routine performed by the graphics rendering apparatus and method according to the invention.

An overview of the processing performed by the rendering apparatus 100 shown in FIG. 1 will be described next with reference to FIGS. 1, 7A and 7B. FIG. 7A shows an example of the main routine performed by the rendering engine 120 in response to the rendering program 122.

In step S10, a first loading operation is performed. In this, the polygon data defining the surfaces of the objects in the 3D space, and, for each texture, data specifying the height and width of the texture, and the pattern data of the lowest-resolution instance $TI_1$ of the texture are loaded into the client computer 102 from the 3D graphics data memory 116 located in the server 110. In particular, the pattern data are stored in the top level of the pyramidal data structure in the pattern data store 134 in the page 132 of the texture data memory 130 corresponding to the texture. In this first loading operation, the width and height values of each texture and the pattern data of the lowest-resolution instance of the texture constitute a small fraction of the texture data defining the texture. Moreover, the number of polygon data is relatively small. Accordingly, this step executes in a relatively short time.

In step S11, the rendering engine 120 performs a data structure initialization operation for each of the textures. The operation is performed in response to the width and height values of the texture. In this initialization operation, the width and height values are used to calculate the number of instances ($N_{res}$) of the texture. Also calculated, or read from a look-up table, are the tile pitch $T_p$, i.e., the number of tiles in the rows of each instance of the texture, and the tile base $T_b$, i.e., the tile number of the lowest-numbered tile of each instance.

The initialization operation also uses the results generated by the above-described calculations and the texture height and width values to set up in the page 132 of the texture data memory 130 corresponding to each texture the pyramidal data structure of the pattern data store 134, the tile load list 136, the tile base array 138, the tile pitch array 140 and the access map array 142. The processing performed in step S11 will be described in greater detail below with reference to FIG. 9.

In step S12, the rendering engine 120 uses the polygon data alone to perform conventional geometry calculations that calculate the projections of the polygons onto the rendering screen.

In step S13, the rendering engine 120 performs an initial rasterizing operation. In this, the projections of the polygons onto the rendering screen are converted into object pixels corresponding to the pixels of the rendering screen, hidden surface removal operations are performed and intensity coefficients are calculated for all pixels of the rendering screen. In addition, texture identifiers and texture coordinates are calculated for those pixels of the rendering screen that correspond to object pixels belonging to polygons whose appearance is defined by texture data. Finally, color values are determined for the remaining rendering screen pixels. These pixels of the rendering screen correspond to object pixels belonging to polygons whose appearance is defined by direct color data. To simplify the following description, an object pixel belonging to a polygon whose appearance is defined by texture data will be called a texture data pixel, and an object pixel belonging to a polygon whose appearance is defined by direct color data will be called a direct color data pixel.

The processing performed to convert the polygons into object pixels is conventional, and will not be described here. Where the projections of the polygons overlap on the rendering screen, more than one object pixel will correspond to each rendering screen pixel.

The hidden surface removal operation identifies the surfaces of the objects, or the portions of such surfaces, that can be seen from the view point. In this, rendering engine first initializes the depth value stored in each cell of the depth buffer 125 corresponding to a pixel of the rendering screen to a maximum value.

The rendering engine then performs a depth calculation for each object pixel. The depth calculation calculates the distance between the object pixel (the current object pixel) and the view point. The rendering engine then compares the distance value calculated by the distance calculation with the depth value previously stored in the cell of the depth buffer 125 corresponding to the location of the object pixel in the rendering screen. If the distance value of the current object pixel is more than the depth value stored in the depth buffer, this indicates that the current object pixel is located behind (and is therefore obscured by) the object pixel to which the depth value stored in the depth buffer belongs (the prior object pixel). Since the current object pixel cannot be seen from the view point, it is irrelevant to rendering the image and its distance value is discarded. On the other hand, if the distance value of the current object pixel is less than the depth value stored in the depth buffer, this indicates that the current object pixel is located in front of (and therefore obscures) the prior object pixel. In this case, the distance value of the current object pixel is adopted as the depth value and is stored in the depth buffer, replacing the depth value of the prior object pixel.

When the rendering engine 120 adopts the distance value of the current object pixel as a replacement depth value and stores the distance value in the depth buffer 125, it additionally determines intensity coefficients for the current object pixel. Moreover, when the current object pixel is a texture data pixel, the rendering engine determines a texture identifier and calculates texture coordinates for the current object pixel. Intensity coefficients, the texture identifier and texture coordinates will be described in more detail below. The rendering engine then stores the intensity coefficients, texture identifier and texture coordinates for the current object pixel in a cell of the reference buffer 126 corresponding to the location of the cell of the depth buffer in which the depth value of the current object pixel is stored. The rendering engine also generates a pixel-type bit and stores the pixel-type bit in the cell. The state of the pixel-type bit indicates that the data stored in the cell relate to a texture data pixel. The structure of the cells of the reference buffer will be described below with reference to FIG. 8. If the depth value of the current object pixel replaces the depth value of a prior object pixel in the depth buffer, the intensity coefficients, texture identifier, texture coordinates, and pixel-type bit of the current object pixel replace the intensity coefficients or color values, texture identifier, texture coordinates and pixel-type bit of the prior object pixel in the corresponding cell of the reference buffer.

Finally, when the current object pixel is a direct color data pixel, the rendering engine 120 multiplies the intensity coefficients for the current object pixel by the polygon color data for the polygon to which the current object pixel belongs, and stores the resulting color values in the cell of the reference buffer 126 corresponding to the location of the depth buffer cell in which the depth value of the current object pixel is stored. In this case, the rendering engine generates the pixel-type bit in the state that indicates that the data stored in the cell relate to a direct color data pixel and stores the pixel-type bit in the cell. The color values and pixel-type bit replace any color values or intensity coefficients and pixel-type bit previously stored in the cell of the reference buffer. Color values for the rendering screen pixels corresponding to texture data pixels cannot be calculated in step S13 because most of the pattern data of the texture have not been loaded when step S13 is performed.

Instead of calculating the intensity coefficients, etc. only if the current object pixel is visible, the rendering engine 120 may unconditionally calculate the intensity coefficients, determine a texture identifier, calculate texture coordinates or color values for every object pixel. In this case, the rendering engine stores the intensity coefficients, texture identifier and texture coordinates or color values for the current object pixel in the current object pixel's cell of the reference buffer 126 only if it also stores the depth value of the current object pixel in the depth buffer 125.

The intensity coefficients are real values in the range from 0 to 1 that take into account such factors as the position, color and intensity of light sources in the 3D space. Normally, a set of three intensity coefficients is calculated for an object pixel, one for each of the three primary colors, red, green and blue. If the light incident on a polygon has a low intensity, the polygon will appear relatively dark. Moreover, if the surface of the polygon is one color, such as red, but the color of the incident light is another color, such as green, this affects the apparent color of the polygon. The intensity coefficients are usually calculated using known techniques based on property data that are part of the polygon data loaded from the polygon data memory 112. The color, intensity, position, and direction of the light source, the color and intensity of any ambient light, and the position and direction, etc. of the view point are used as coefficients when calculating the intensity coefficients. When the current object pixel is a direct color data pixel, the intensity coefficients of the current object pixel are multiplied by polygon color data of the polygon to obtain a set of color values that is stored in a cell of the reference buffer 126. In step S14, the direct color values are copied to a cell of the frame buffer 127 corresponding to the position of the current object pixel in the rendering screen. When the current object pixel is a texture data pixel, the intensity coefficients of the current object pixel are stored in the cell of the reference buffer 126. In step 14, the intensity coefficients are multiplied by a set of texture color values to obtain a set of color values. The color values are stored in the cell of the frame buffer 127 corresponding to the position of the object pixel in the rendering screen.

The texture identifier identifies the texture whose texture data will be used to determine the color values of the object pixel, and can be the address of the page of the texture data memory in which the texture data of the texture are stored. The texture coordinates are the coordinates of the texture pixel whose pattern data will be used to determine the color value of the object pixel.

FIG. 8 shows an example of the structure of the exemplary cell 151 of the reference buffer 126. The cell includes the four fields 153, 155, 157 and 159, some of which store multiple items of data. A pixel-type bit is stored in the field 153. The state of the pixel-type bit indicates whether the data stored in the cell relate to a texture data pixel or to a direct color data pixel. The data stored in the remaining fields differ depending on whether the object pixel to which the data relate is a texture data pixel or a direct color data pixel, i.e., on the state of the pixel-type bit. When the data stored in the cell 151 relate to a texture data pixel, the pixel-type bit stored in the field 153 is set to its 1 state, for example, and the texture identifier identifying the texture is stored in the field 155, the texture coordinates p, q are stored in the field 157, and the red, green and blue intensity coefficients IR, IG and IB, respectively, are stored in the field 159. When the data stored in the cell 151 relate to a direct color data pixel, the pixel-type bit stored in the field 153 is set to its 0 state, for example, the fields 155 and 157 are reserved, and the red, green and blue color values R, G and B, respectively, are stored in the field 159.

When the initial rasterizing operation performed in step S13, execution then advances to step S14, which is the first step of a display and load loop composed of steps S14, S15 and S16. This loop initially renders and displays the image with a low texture resolution and then successively displays the image with progressively increasing texture resolutions until all parts of the image are rendered with optimum resolution. As noted above, optimum resolution is not necessarily the same as the highest resolution of the texture, since a texture applied to the surface of a 3D object located in the 3D space at a point remote from the view point or a texture applied to a surface of a 3D object at an angle to the view point does. not have to be rendered using the pattern data of the highest-resolution instance of the texture. The viewer will be unable to perceive the difference between such parts of an image rendered using the pattern data of the highest-resolution instance of the texture and those rendered using the pattern data of a lower-resolution instance of the texture. Using the pattern data of the lower-resolution instances of the texture to render such parts of the image speeds the rendering process because fewer pattern data need be loaded.

In step S14, the rendering engine 120 examines the pixel-type bit stored in field 153 of each cell 151 of the reference buffer 126 to determine whether the data stored in the cell relate to a direct color data pixel or a texture data pixel. If the data stored in the cell relate to a direct color data pixel, the rendering engine copies the color values stored in field 159 of the cell to the corresponding cell of the frame buffer 127. If the data stored in the cell relate to a texture data pixel, the rendering engine reads the texture identifier from field 155 of the cell and reads the texture coordinates (p,q) from field 157 of the cell. The rendering engine then goes to the page 132 of the texture data memory 1 30 identified by the texture identifier and, from the pattern data store 134 stored in that page, reads the texture data stored at the location defined by the texture space coordinates. In the first iteration of the loop composed of steps S14–S16, the pattern data read are the pattern data of the lowest-resolution instance $TI_1$ of the texture. In later iterations of the loop, the pattern data of higher-resolution instances of the texture may be read.

The rendering engine 120 multiplies the pattern data read from the pattern data store 134 by the intensity coefficients stored in field 159 of the cell 151 of the reference buffer 126 corresponding to the rendering screen pixel, and the resulting color values for the rendering screen pixel are stored in the cell of the frame buffer 127 corresponding to the rendering screen pixel. This process is repeated for each rendering screen pixel corresponding to a texture data pixel to store color values in the cell of the frame buffer corresponding to the rendering screen pixel.

Also, the rendering engine 120 checks the access maps of the tiles of the current instance of the texture to identify the tiles of the next-higher instance of the texture whose pattern data are required to render the image with a higher resolution, and sets the tile load list entries of the identified tiles of the next-higher resolution instance to 10 (required but not loaded). For example, during the first iteration of the loop, the access maps of the tiles of the lowest-resolution instance $TI_1$ are checked to identify the tiles of the next-higher instance $TI_2$ whose pattern data are required to render the image with a higher resolution.

Finally, the color values stored in the frame buffer 127 are read and a video signal is generated in response to the color values. The video signal is fed via the video output port 118 to the video monitor 150. In response to the video signal, the video monitor displays the two-dimensional image representing the 3D objects in the 3D space. The image shows the parts of the 3D objects visible from the view point. The processing performed in step S14 will be described in more detail below with reference to FIG. 10.

In step S15, the rendering engine 120 performs a test to determine whether any of the pattern data of the next-higher resolution instance of the texture are required to render the image with a higher resolution. For example, during the first iteration of the loop, the test determines whether any of the pattern data of the next-higher resolution instance $TI_2$ of the texture are required to render the image with a higher resolution. The processing performed in this step will be described in greater detail below with reference to FIG. 12. When the test result is NO, indicating that the video signal generated in step S14 represents the image with optimum resolution, execution advances to step S17, where it stops. When the test result is YES, execution advances to step S16.

In step S16, the rendering engine 120 loads through the network 106 from the texture data memory 114 in the server 110 the pattern data of the tiles whose tile load list entries were set to 10 in step S14. The rendering engine stores the pattern data in the client computer 102 in the appropriate locations in the pyramidal data structure in the pattern data store 134 in the page 132 corresponding to the texture in the texture data memory 130. The loading process preferably uses a protocol called the Internet Imaging Protocol (IIP). This protocol also used for transferring FLASHPIX™ formatted image data through a network. In addition, the rendering engine sets the tile load list entries for the tiles whose pattern data have just been loaded to 11, indicating that the pattern data for these tiles now exist in the pyramidal data structure. Also in this step, the rendering engine creates an access map AM(t), where t is the tile number, for each tile whose pattern data have been loaded. The access map is created in the access map array 142, and includes an entry for each texture pixel of the tile. The state of each entry is initialized to 0.

After step S16 has been performed, execution returns to step S14, and the rendering engine 120 begins a second iteration of the display and load loop composed of the steps S14–S16. In this second iteration of step S14, the rendering engine renders the image using the pattern data of the next-higher resolution instance $TI_2$ of the texture. The rendering engine may use some of the texture data of the lowest-resolution instance $TI_1$ to render those parts of the image that do not require the higher resolution of the instance $TI_2$ to provide optimum resolution. New color values are generated, and the image is re-displayed on the monitor 150 in response to a video signal obtained from the new color values. At least part of the re-displayed image has a higher resolution.

The rendering engine 120 performs iterations of the display and load loop composed of the steps S14–S16 until at least part of the image is displayed on the video monitor 150 using the highest-resolution instance of the texture. At this point, no further increases in the resolution of the image are possible, and the test performed in step S15 indicates that no additional pattern data need be loaded. When this condition is met, execution proceeds to step S17, where it stops.

Figure 7B:
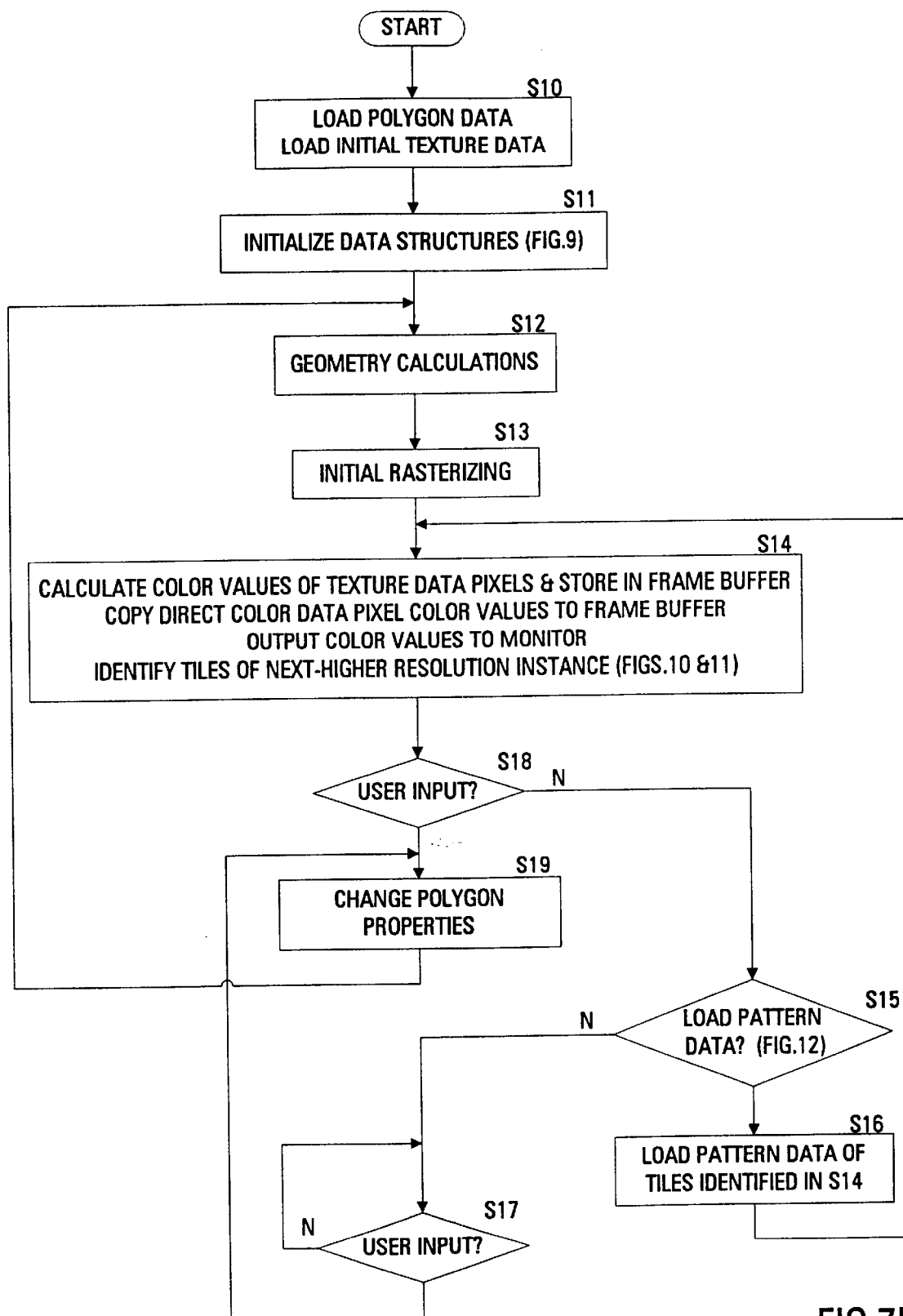
FIG. 7B is a flow chart illustrating a variation on the main graphics rendering routine performed by the graphics rendering apparatus and method according to the invention.

FIG. 7B shows a variation on the main routine shown in FIG. 7A. The variation is performed by the rendering engine 120 in response to the rendering program 122. This variation provides the user with the ability to enter instructions that change any or all of the view point, the positions of any light sources, and the positions of one or more of the 3D objects in the 3D space. Elements of the routine that correspond to elements of the routine shown in FIG. 7A are indicated by the same reference numeral and will not be described again here. However, the descriptions of such elements are abbreviated in FIG. 7B to simplify the drawing. In the routine shown in FIG. 7B, step S18 is interposed between steps S14 and S15 of the routine shown in FIG. 7A, and the routine includes the additional step S19. Step S18 enables the user, by entering instructions that make any of the above-mentioned changes, to abandon rendering the current image. The rendering apparatus then begins almost immediately to render a new image in response to the user's instructions. Consequently, the user does not have to wait for the rendering apparatus to finish rendering the current image before it starts rendering the new image.

In step S18, a test is performed to determine whether the user has entered instructions that make any of the above-mentioned changes. If the test result is NO, indicating that the user has not entered such instructions, execution advances to step S15, and the remainder of the display and load loop composed of the steps S14–S16 executes as described above. If the test result is YES, indicating that the user has entered such instructions, execution advances to step S19.

In step S19, if the instructions entered by the user require it, the properties of the polygons forming the 3D object are converted and coordinate transformations are newly performed on the polygons. Execution then returns to step S12 where the geometry calculations are repeated using the changed polygons, and the process of rendering the image is performed anew.

When the test result performed in step S15 is NO, indicating that there are no further pattern data to be loaded, execution passes to step S17, which repetitively tests to determine whether the user has entered instructions that require that the process of rendering the image to be performed anew. When the user enters such instructions, the test result is YES, and execution advances to step S19, described above.

Figure 9:
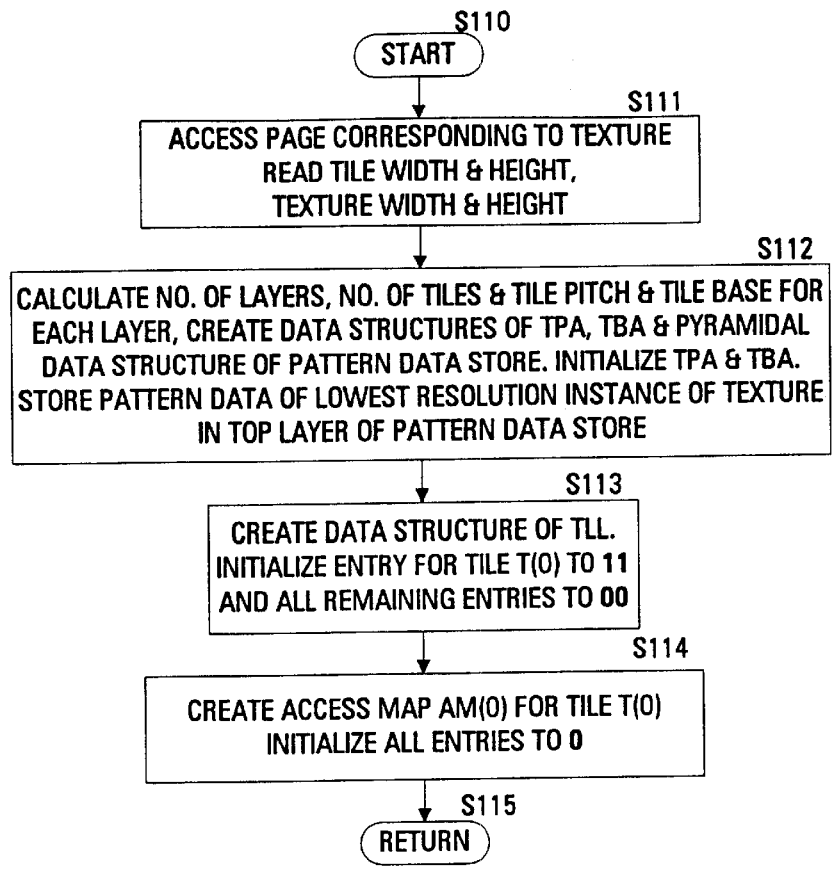
FIG. 9 is a flow chart showing details of the subroutine performed in step S11 of the main routines shown in FIGS. 7A and 7B.

FIG. 9 shows details of the data structure initialization subroutine performed in step S11 of the main routines shown in FIGS. 7 and 8. The subroutine is performed for each of the textures for which initial texture data were loaded in step S10.

Processing starts at step S110.

In step S111, the rendering engine 120 accesses the page 132 of the texture data memory 130 corresponding to the texture and reads the texture width W, the texture height H, the tile width TW, and the tile height TH constituting part of the texture data stored therein.

In step S112, the structural features of the pyramidal data structure of the pattern data store 134, the tile pitch array 138 and the tile base array 140 are determined, and tile pitch and tile base values are stored in the tile pitch array and the tile base array, respectively. The texture width W, the texture height H, the tile width TW, and the tile height TH are used to calculate the number of layers $N_{res}$ in the pyramidal data structure, the total number of tiles $N_{tile}$ that will be stored in the pyramidal data structure, the tile pitch $T_p$ for each layer, and the base tile $T_b$ for each layer. The tile pitch is the number of tiles in the horizontal direction in the layer, the tile base is the tile number of the lowest-numbered tile, e.g., the top, left-hand tile, of the layer.

A memory array having the above-determined structural characteristics of the pyramidal data structure is created in the texture's page 132 of the texture data memory 130 to serve as the pattern data store 134. Two memory arrays having elements equal in number to the number of layers are created to serve as the tile pitch array 138 and the tile base array 140. The tile pitch values and a tile base values are stored in the tile pitch array and the tile base array, respectively. The pattern data of the lowest-resolution instance $TI_1$, i.e., the pattern data of the tile T(0), received during the initial loading operation performed in step S10 of the main routine are stored in the top layer of the pyramidal data structure of the pattern data store 134 in the texture's page 132 of the texture data memory 130.

In step Si 13, an array having elements equal in number to $N_{tile}$ is created in the texture's page 132 of the texture data memory 130 to serve as the tile load list 136. All of the entries in the tile load list are initialized to 00 (not needed, not loaded) except for the entry for the tile $TI_1$, whose entry is initialized to 11 (needed and loaded).

In step S114, the access map AM(0) for the tile T(0) of the lowest-resolution instance $TI_1$ of the texture is created as an element of the access map array 142 in the texture's page 132 of the texture data memory 130. The access map has an entry for each texture pixel of the tile. All of the entries are initialized to 0. Additional elements of the access map array are created later in step S14 of the main routine.

Execution then advances to step S115, whence it returns to the main routine.

Figure 10:
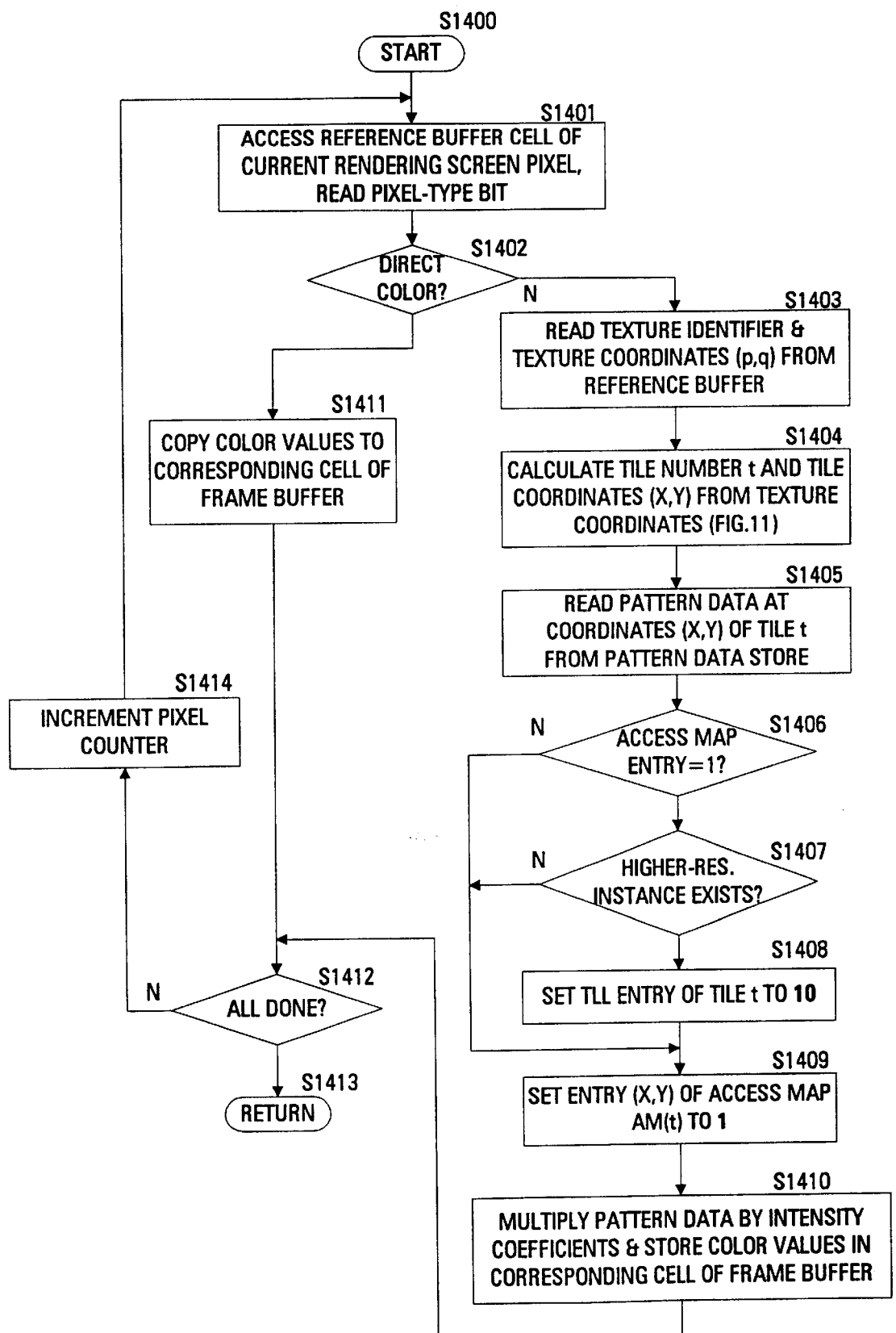
FIG. 10 is a flow chart showing details of the subroutine performed in step S14 of the main routines shown in FIGS. 7A and 7B.

FIG. 10 shows details of the subroutine performed in step S14 of the main routine. The subroutine is performed for each pixel of the rendering screen. The pixel of the rendering screen processed by the current iteration of the subroutine will be called the current pixel. The subroutine will be described with reference to FIGS. 1, 8 and 10. In this subroutine, the current pixel of the rendering screen, and the cells of the reference buffer 126 and the frame buffer 127 corresponding to the current pixel, are indicated by the value of a pixel counter.

Execution begins at step S1400.

In step S1401, the rendering engine accesses the cell 151 of the reference buffer 126 corresponding to the current pixel of the rendering screen, and reads the pixel-type bit stored in field 153 of the cell.

In step 1402, the rendering engine tests the pixel-type bit to determine whether the current rendering screen pixel corresponds to a direct color data pixel. If the test result is YES, execution advances to step S1411, which will be described next. If the test result is NO, indicating that the color values of the current rendering screen pixel are determined using the pattern data of a texture, execution advances to step S1403, which will be described below.

In step S1411, which is performed when the pixel-type bit indicates that the current rendering screen pixel corresponds to a direct color data pixel, the rendering engine copies the color values for the current rendering screen pixel stored in field 159 the reference buffer 126 to the corresponding cell of the frame buffer 127. Execution then advances to step S1412, which will be described below.

The processing performed when the pixel-type bit indicates that the current rendering screen pixel corresponds to a texture data pixel will now be described. In step S1403, the texture identifier is read from field 155 of the cell, and the texture coordinates (p, q) are read from field 157 of the cell.

In step S1404, the rendering engine performs the subroutine to be described below with reference to FIG. 11 to determine the tile number t and the tile coordinates (X, Y) from the texture coordinates (p, q). The tile coordinates indicate the texture pixel of the tile whose pattern data will be used to determine the color values of the current rendering screen pixel.

In step S1405, the rendering engine reads the pattern data P(t:X,Y) from the pattern data store 134 in the page of the texture data memory indicated by the texture identifier read in step 1403. The pattern data read are those stored in the location in the pyramidal data structure corresponding to the tile coordinates (X,Y) in the tile with tile number t.

In step S1406, the rendering engine performs a test to determine whether the entry corresponding to the tile coordinates (X,Y) in the access map AM(t) for tile number t is set to 1. If the test result is NO, execution advances to step S1409, which will be described below. If the test result is YES, execution advances to step S1407. A YES result in the test performed this step indicates that the pattern data P(t:X,Y) have been used to calculate the color values of another pixel of the rendering screen. This in turn indicates that the resolution is therefore sub-optimum, and that the image would be rendered with a resolution closer to optimum resolution using the pattern data of a tile T(t') of the next-higher resolution instance of the texture, if such higher resolution instance exists.

In step S1407, the rendering engine performs a test to determine whether a higher-resolution instance of the texture exists. If the test result is NO, execution advances to step S1409, which will be described below. If the test result is YES, indicating that a higher-resolution instance of the texture exists, the pattern data of the tile T(t') of the higher-resolution instance corresponding in position to the coordinates (p,q) of the tile T(t) must be loaded. Execution advances to step S1408, where the entry for the tile T(t') in the tile load list 136 is set to 10 (required but not loaded), to indicate that the pattern data of this tile must be loaded the next time step S16 of the main routine is performed. The tile load list entry for the tile T(t') may already be set to 10 as a result of the pattern data of this tile being needed by a neighboring rendering screen pixel processed in a previous iteration of the subroutine shown in FIG. 14. Execution then advances the step S1409.

In step S1409, the rendering engine 120 sets to 1 the entry corresponding to the tile coordinates (X,Y) in the access map AM(t) for the tile with tile number t. This may or may not change the state of this entry, depending on whether or not the entry has been set to 1 in a previous iteration of the subroutine shown in FIG. 14. Execution then advances to step S1410.

In step S1410, the rendering engine reads the intensity coefficients IR, IG, IB from the field 159 of the cell 151 of the reference buffer 126 corresponding to the current rendering screen pixel and multiplies the intensity coefficients by the pattern data P(t:X,Y) read from the pattern data store 134 in step S1405. The resulting color values are stored in the cell of the frame buffer 127 corresponding to the current rendering screen pixel. Execution then advances to step S1412.

In step 1412, the rendering engine 120 performs a test to determine whether color values for all of the pixels of the rendering screen have been stored in the corresponding cells of the frame buffer 127. If the test result is NO, and color values have not been stored in the frame buffer for all the pixels of the rendering screen, execution advances to step S1413, whence it returns to the main routine. If the test result is YES, execution advances to step S1414, where the pixel counter that counts the rendering screen pixels is incremented by one. Execution then returns to step S1401 so that the color values for another rendering screen pixel can be generated and stored in the corresponding cell of the frame buffer.

Figure 11:
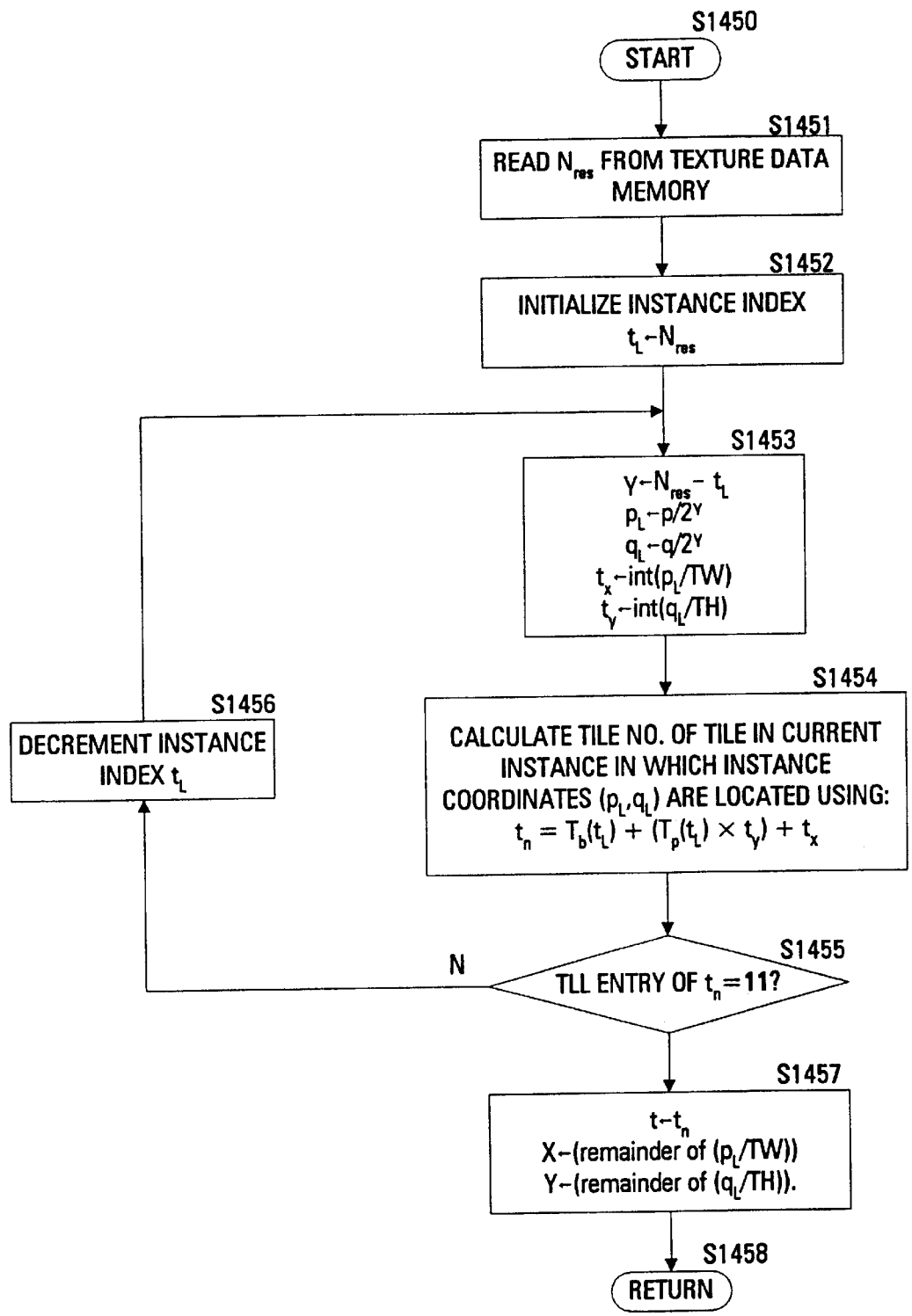
FIG. 11 is a flow chart showing details of the subroutine performed in step S1404 of the subroutine shown in FIG. 10.

FIG. 11 is a flow chart showing details of the processing performed in step S1404 of the subroutine shown in FIG. 10 to calculate the tile number t and the tile coordinates (X, Y) from the texture coordinates p, q. Processing starts at step S1450.

In step S1451, the rendering engine 120 reads from the page 132 of the texture data memory 130 corresponding to the texture the value of $N_{res}$, which indicates the number of instances of the texture. This number corresponds to the number of layers in the pyramidal data structure 134 in which the pattern data of the texture will be stored.

In step S1452, the value $t_L$ of a current instance index that indicates the instance currently being processed by the subroutine is set to $N_{res}$. The instance currently being processed will be called the current instance.

Step S1453 is the first step of a loop composed of the steps S1453–S1456. The loop decrements the current instance index to locate the tile corresponding to the texture coordinates (p,q) of the highest resolution instance of the texture whose pattern data have been loaded. In step S1453, the rendering engine subtracts the value of the current instance index $t_L$ from $N_{res}$ to generate the instance difference parameter y. Then, the rendering engine converts the texture coordinates (p,q), which relate to the highest-resolution instance of the texture, into instance coordinates $(p_L, q_L)$ in the current instance by dividing the texture coordinates (p,q) by two raised to the power of the instance difference parameter, i.e.:

$y \leftarrow N_{res} - t_L$, $p_L \leftarrow p/2^y$ $q_L \leftarrow q/2^y$

Finally, the rendering engine respectively calculates the coordinates $(t_x, t_y)$ of the tile in the current instance $t_L$ in which the instance coordinates $(p_L, q_L)$ are located are by dividing $p_L$ by the tile width TW and taking the integer portion of the resulting quotient, and by dividing $q_L$ by the tile height TH and taking the integer portion of the resulting quotient, i.e.:

$t_x \leftarrow \text{int}(p_L/\text{TW})$ $t_y \leftarrow \text{int}(q_L/\text{TH})$ For example, when $t_L = N_{res}$, $N_{res} = 5$, TW=64, TH=64, p=511 and q=512, since:

$t_x = \text{int}(511/64) = 7$ $t_y = \text{int}(512/64) = 8$, the tile corresponding to the texture coordinates (511, 512) in the highest-resolution instance of the texture is the seventh tile in the x-direction and the eighth tile in the y-direction.

In step S1454, the rendering engine 120 calculates the tile number $t_n$ of the tile in the current instance $t_L$ in which the instance coordinates $(p_L, q_L)$ are located. The tile number is calculated using the quantities calculated in step S1454 and the tile pitch $T_p(t_L)$ and the tile base $T_b(t_L)$ read from the locations in the tile pitch array and the tile base array corresponding to the current layer $t_L$. The rendering engine stores the tile pitch array and the tile base array in the locations 138 and 140 of the texture's page 132 in the texture data memory 130. The rendering engine then calculates the tile number $t_n$ by determining the product of the tile pitch and the y-coordinate $t_y$ of the tile, and then summing the product, the tile base, and the x-coordinate $t_x$ of the tile, i.e.:

$t_n = T_b(t_L) + (T_p(t_L) \times t_y) + t_x$

In step S1455, the rendering engine 120 performs a test to determine whether the tile load list entry for the tile having tile number $t_n$ is set to 11. The tile load list 136 is stored in the texture's page 132 of the texture data memory 130. The tile load list entry being set to 11 indicates that the pattern data for the tile having tile number $t_n$ exist in the pattern data store 134. If the test result is NO, indicating that the pattern data of the tile with tile number $t_n$ do not exist in the pattern data store, execution advances to step S1456, which will be described next. Otherwise, execution advances to step S1457, which will be described below.

In step S1456, the rendering engine decrements the value $t_L$ of the current instance index by one, i.e., $t_L \leftarrow t_L - 1$. Execution then returns to step S1453, and the loop composed of steps S1453–S1456 is repeated until the test performed at step S1455 returns a YES result. The test performed at step S1455 will always eventually return a YES result because the pattern data of the lowest-resolution instance of the texture were loaded in step S10 of the main routine.

In step S1457, which is performed if the pattern data of the tile with tile number $t_n$ exist in the pyramidal data structure 134, the rendering engine 120 sets the tile number t to $t_n$, the tile coordinate X to the remainder of the division of $p_L$ by the tile width TW, and the tile coordinate Y to the remainder of the division of $q_L$ by the tile height TH, i.e.:

$t \leftarrow t_n$,
X←(remainder of $(p_L/TW)$)
Y←(remainder of $(q_L/TH)$).

Execution then advances to step S1458, whence it returns to the subroutine described above with reference to FIG. 10.

Figure 12:
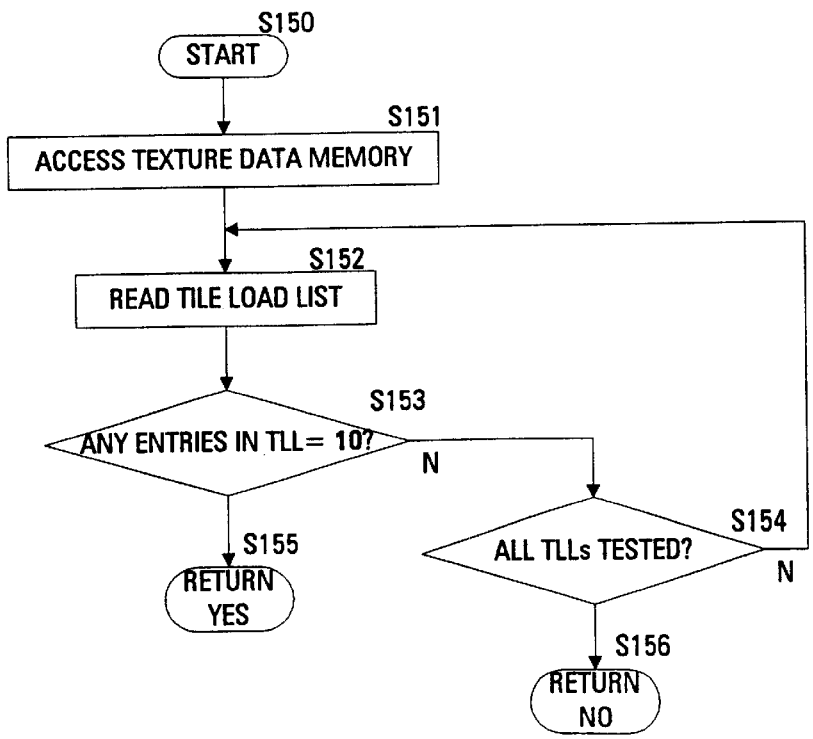
FIG. 12 is a flow chart showing details of the subroutine performed in step S15 of the main routines shown in FIGS. 7A and 7B.

FIG. 12 is a flow chart showing details of the subroutine performed in step S15 of the main routine shown in FIGS. 7A and 7B to determine whether any pattern data need to be loaded. Processing begins at step S150.

In step S151, the rendering engine 120 accesses the texture data memory 130.

In step S152, the rendering engine reads the tile load list 136 stored in one page 132 of the texture data memory 130.

In step S153, the rendering engine performs a test on the tile load list read in step S152 to determine whether any of the entries of the tile load list are set to 10 (required but not loaded). If the test result is YES, indicating that pattern data of at least one tile need to be loaded, execution advances to step S155. Execution returns to the main routine from step S155 with a YES result. If the test result is NO, execution advances to step S154.

In step S154, the rendering engine performs a test to determine whether it has tested the tile load lists 136 stored in all of the pages 132 of the texture memory 130. If the test result is NO, execution returns to step S152 so that the rendering engine can test the tile load list stored in another page of the texture memory whose tile load list it has not previously tested. If the test result is YES, indicating that the rendering engine has tested the tile load lists stored in all of the pages of the texture memory, execution advances to step S156. Execution returns to the main routine from step S156 with a NO result.

Each time the rendering engine executes step S16 of the main routine a YES result is obtained in step S152 of the step S15 subroutine shown in FIG. 12, the rendering engine causes the pattern data of the tiles identified in step S14 of the main routine to be successively loaded from the server 110 into the pyramidal data structure of the pattern data store 134 in the page 132 of the texture data memory 130 corresponding to each texture. The pattern data loaded belong to an instance of the texture having one level higher resolution than the instance of the texture whose pattern data were loaded in the previous execution of step S16. Then, the next time step S14 of the main routine is executed, at least part of the image of the 3D object is displayed in response to color values calculated using the higher-resolution pattern data.

In the above-described graphics rendering apparatus, an image of the 3D object is rendered at high speed and with optimum resolution. Particularly in a network environment, the image is successively rendered with progressively increasing resolution as the display time elapses.

Furthermore, in the graphics rendering apparatus according to the invention, each step or each process can be realized by software running on a suitable CPU or DSP or by suitably-constructed hardware. In addition, in a World Wide Web or other network browser, for example, the processing program described above can be loaded as a plug-in for rendering images of 3D objects.

When the image of the 3D object is to be printed, the first through K-th instances of the texture are used. However, when the image of the 3D object is to be displayed on a display, such as the monitor 150, the first to (K–n)-th instances of the texture can be used, where n is an integer greater than or equal to unity. In other words, when the image is displayed on a display, the highest-resolution parts of the image may have a resolution less than that of the original texture.

EXAMPLES

Example 1

Example 1 describes sequentially pasting an isosceles, right-angled, triangular portion of the first through fifth instances, $TI_1$, $TI_2$, $TI_3$, $TI_4$ and $TI_5$ of the texture TI onto an isosceles, right-angled triangular polygon forming part of the surface of a 3D object located in the 3D space, and rendering and displaying the resulting image. Also described will be the effect of gradually enlarging the polygon, as happens, for example, when the 3D object moves towards the view point.

Figure 13:
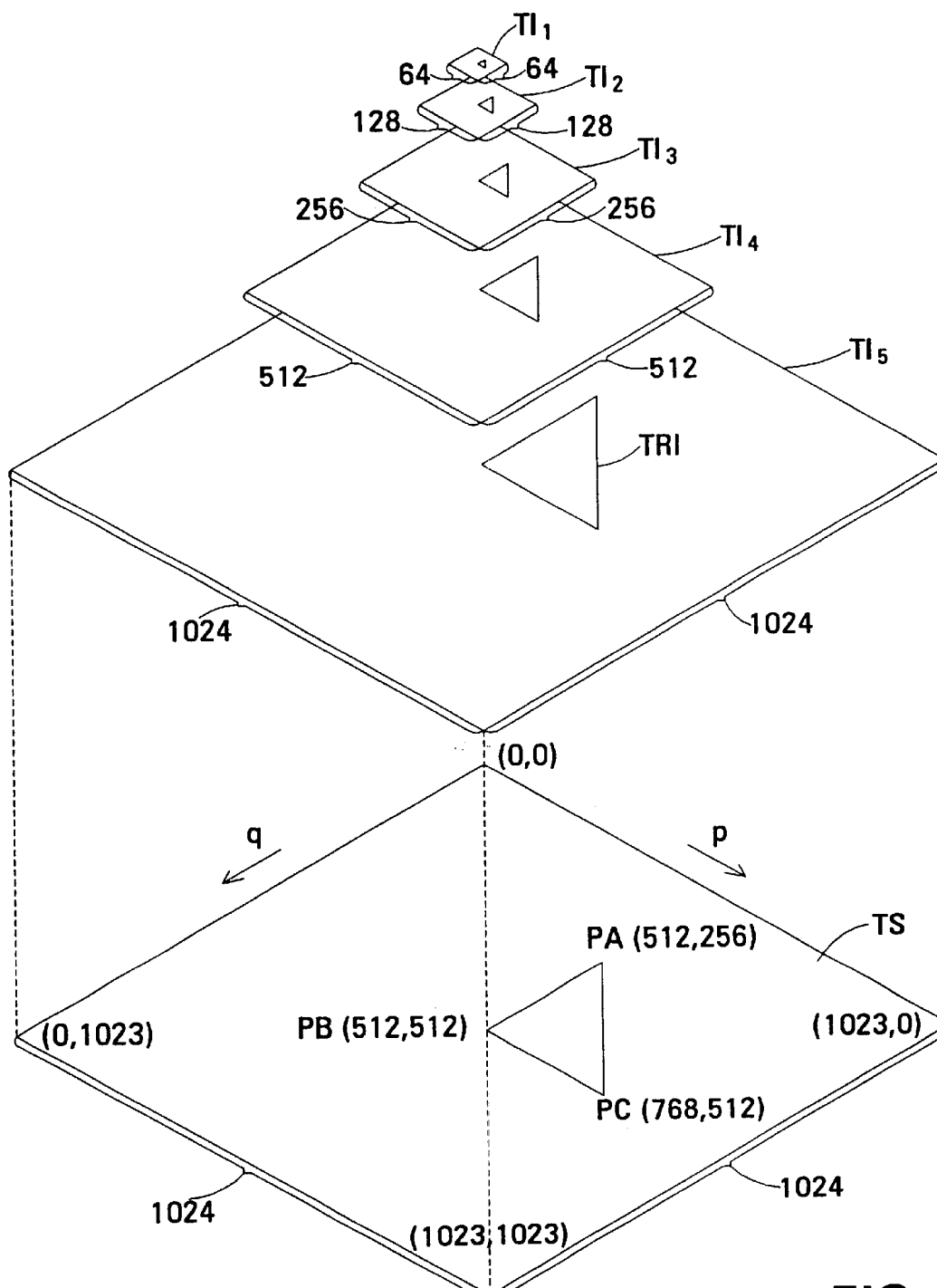
FIG. 13 shows first through fifth instances $TI_1$, $TI_2$, $TI_3$, $TI_4$, $TI_5$ of a texture used in a first example of the rendering operation performed by the rendering apparatus and method according to the invention.

FIG. 13 shows the first through fifth instances $TI_1$, $TI_2$, $TI_3$, $TI_4$, and $TI_5$ of the texture TI in the two-dimensional texture space TS. The size and resolution of the highest-resolution instance $TI_6$ of the texture are the same as those of the texture space TS. The sizes of the instances $TI_1$–$TI_6$, and their linear resolution relative to that of the highest-resolution instance $TI_6$ are shown in Table 3.

TABLE 3

| Instance | Size (texture pixels) | Linear resolution relative to highest-resolution instance $TI_5$ |
| --- | --- | --- |
| $TI_1$ (lowest) | 64 × 64 | $2^{-4}$ |
| $TI_2$ | 128 × 128 | $2^{-3}$ (=⅛) |
| $TI_3$ | 256 × 256 | $2^{-2}$ (=¼) |
| $TI_4$ | 512 × 512 | $2^{-1}$ (=½) |
| $TI_5$ | 1024 × 1024 | $2^0$ (=1) |

The texture coordinates (p,q) in the 2-dimensional texture space TS have 1,024 discrete values along the horizontal p-axis and along the vertical q-axis that correspond to the 1024 texture pixels in each direction of the highest-resolution instance $TI_5$ of the texture. FIG. 13 also shows the texture coordinates of the vertices PA, PB, PC of the triangular portion TRI of the texture TI in the 2-dimensional texture space TS. These coordinates are (512, 256), (512, 512), and (768, 512), respectively.

Figures 14A, 14B:
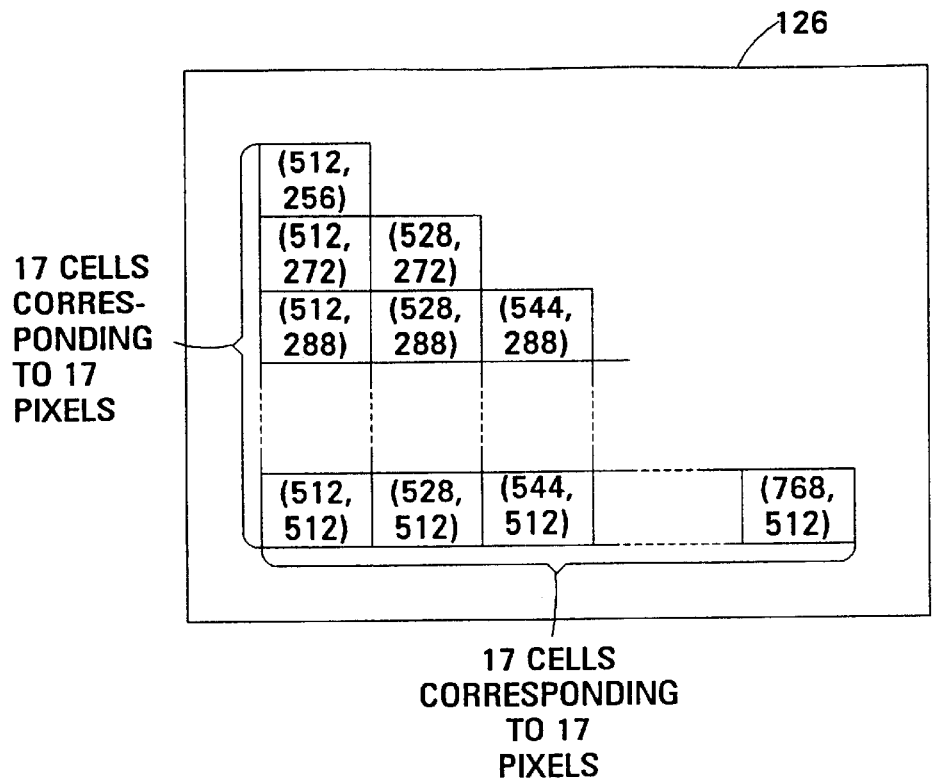
FIG. 14A shows an example of the texture coordinates stored in the reference buffer when the triangular portion TRI of the texture shown in FIG. 13 is pasted onto a small polygon.
FIG. 14B shows the relationship between the texture coordinates stored the reference buffer shown in FIG. 14A and the instance coordinates of the lowest-resolution instance $TI_1$ of the texture. The instance coordinates of the instance $TI_1$ have 64 discrete values along the p-axis and the q-axis.
Figures 15A, 15B:
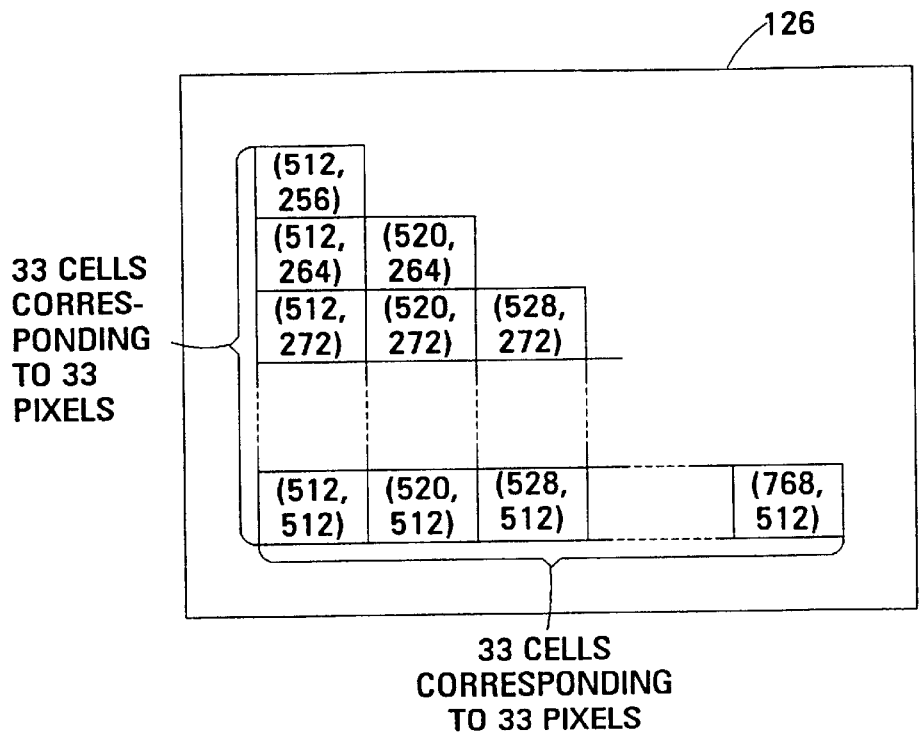
FIG. 15A shows an example of the texture coordinates stored in the reference buffer when the triangular portion TRI of the texture shown in FIG. 13 is pasted onto a polygon approximately twice the size of the polygon of the FIG. 14A example.
FIG. 15B shows the relationship between the texture coordinates stored the reference buffer shown in FIG. 15A and the instance coordinates of the lowest-resolution instance $TI_1$ and the higher-resolution instance $TI_2$ of the texture. The instance coordinates of the instance $TI_2$ have 128 discrete values along the p-axis and the q-axis.
Figures 16A, 16B:
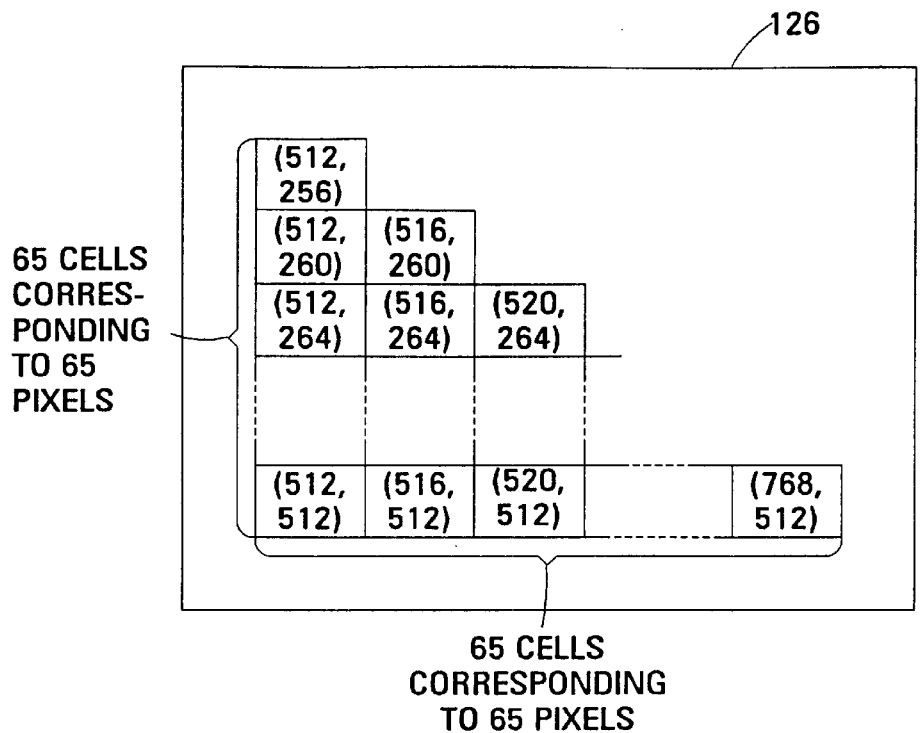
FIG. 16A shows an example of the texture coordinates stored in the reference buffer when the triangular portion TRI of the texture shown in FIG. 13 is pasted onto a polygon approximately four times the size of the polygon of the FIG. 14A example.
FIG. 16B shows the relationship between the texture coordinates stored in the reference buffer shown in FIG. 16A and the instance coordinates of the instances $TI_1$, $TI_2$ and $TI_3$ of the texture. The instance coordinates of the instance $TI_3$ have 256 discrete values along the p-axis and the q-axis.

FIGS. 14A, 15A, and 16A show the texture coordinates (p,q) stored the fields 157 of the cells of the portion of the reference buffer 126 corresponding to the portion of the rendering screen onto which the triangular polygon is projected. Each square in these Figures represents the field 157 of one cell of the reference buffer corresponding to one pixel of the rendering screen. In each square is set forth the contents of field 157 of the corresponding cell, i.e., the texture coordinates (p,q) in the 2-dimensional texture space TS.

In the example shown in FIG. 14A, the isosceles, right-angled triangular polygon onto which the triangular portion TRI of the texture will be pasted defines a relatively small part of the surface of the object. This may be the result of the object surface being located relatively distant from the view point, for example. The equal sides of the polygon have lengths equivalent to 17 pixels of the rendering screen. For convenience, the equal sides of the triangular polygon are aligned parallel to the horizontal and vertical axes of the rendering screen and of the texture space TS. In step S10 of the main routine (FIG. 7A or 7B), the pattern data of the lowest-resolution instance $TI_1$ of the texture are loaded from the server 110 and are stored in the highest layer of the pyramidal data structure in the pattern data store 134 in the texture's page 132 of the texture data memory 130. Then, in the initial rasterizing operation performed in step S13 of the main routine, the texture coordinates (p,q) corresponding to the triangular portion TRI of the texture are assigned to the respective cells in the portion of the reference buffer 126 corresponding to the location of the triangular polygon in the rendering screen. Because the size of the triangular portion of the texture is a factor of sixteen greater than the size of the polygon onto which it is being pasted, the assignment process assigns only one of every 16 texture coordinates in both the horizontal and vertical directions to the cells of the reference buffer. As a result, the texture coordinates differ by 16 between any two cells in either the horizontal and vertical directions, as shown in FIG. 14A.

FIG. 14B shows how the texture coordinates (p,q) stored in the cells of the reference buffer 126 shown in FIG. 14A correspond to the instance coordinates $(p_1,q_1)$ in the lowest-resolution instance $TI_1$ of the texture. In the lowest-resolution instance of the texture, the instance coordinates can have only 64 discrete values in both the horizontal and vertical directions. For the reference buffer cells shown in FIG. 14A, the pattern data of the instance $TI_1$ of the texture are all read from different ones of the instance coordinates $(p_1,q_1)$ in the lowest-resolution instance of the texture $TI_1$. Since the color values of every pixel of the triangular polygon are calculated using pattern data taken from different coordinates of the lowest-resolution instance $TI_1$ of the texture, the part of the image corresponding to the polygon is rendered with optimum resolution. There is no need to load the pattern data of any higher resolution instance of the texture to render this part of the image with optimum resolution.

In the example shown in FIG. 15A, the isosceles, right-angled triangular polygon onto which the triangular portion TRI of the texture is being pasted is approximately twice the size of the triangular polygon in the example described above with reference to FIG. 14A. The equal sides of the polygon have lengths equivalent to 33 pixels of the rendering screen. The larger size of the polygon could be the result of the object surface being located closer to the view point, for example. Again, in step S10 of the main routine, all of the pattern data of the lowest-resolution instance $TI_1$ of the texture are loaded from the server 110 and are stored in the highest layer of the pyramidal data structure in the pattern data store 134 in the texture's page 132 of the texture data memory 130. Then, in step S13 of the main routine, the texture coordinates (p,q) corresponding to the triangular portion TRI of the texture are assigned to the respective cells in the portion of the reference buffer 126 corresponding to the location of the polygon in the rendering screen. Because the size of the triangular portion of the texture is a factor of eight larger than that of the polygon, the assignment process assigns only one of every eight texture coordinates in both the horizontal and vertical directions to the cells of the reference buffer. As a result, the texture coordinates differ by eight between any two cells in either the horizontal and vertical directions, as shown in FIG. 15A.

FIG. 15B shows how the texture coordinates (p,q) stored in the cells of the reference buffer 126 shown in FIG. 15A correspond to the instance coordinates $(p_1, q_1)$ in the lowest-resolution instance $TI_1$ of the texture and to the instance coordinates $(p_2, q_2)$ in the next-lowest resolution instance $TI_2$ of the texture. In the instance $TI_2$ of the texture, the instance coordinates can have 128 discrete values in both the horizontal and vertical directions. When the instance coordinates $(p_1, q_1)$ in the instance $TI_1$ of the texture are assigned to the corresponding cells of the reference buffer, some of the instance coordinates $(p_1, q_1)$ are assigned to more than one of the cells of the reference buffer. For example, the instance coordinates (32, 16) in the instance $TI_1$ of the texture are assigned to the three adjacent cells of the reference buffer to which the texture coordinates (512, 256), (512, 264) and (520, 264) were assigned. Thus, when the image is first displayed using the pattern data of the lowest-resolution instance of the texture, the color values of the corresponding pixels of the rendering screen are generated from the same item of pattern data. As a result, the portion of the image corresponding to the triangular polygon is rendered with sub-optimum resolution.

The rendering engine 120 uses the access map AM(0) stored in the access map array 142 of the page 132 of the texture data memory 130 corresponding to the texture to detect whether the instance coordinates $(p_1,q_1)$ in the instance $TI_1$ of the texture have been assigned to more than one cell of the reference buffer. In the subroutine described above with reference to FIG. 10, the rendering engine uses the access map to detect whether or not any of the instance coordinates $(p_1,q_1)$ of the instance $TI_1$ of the texture have been assigned more than once. If any of the instance coordinates $(p_1, q_1)$ have been assigned more than once, the entry in the tile load list 136 for the corresponding tile in the next-higher resolution instance $TI_2$ of the texture is set to 10 so that the pattern data of this tile will be loaded next time the loading operation is performed in step S16 of the main routine.

When the pattern data of the higher-resolution instance $TI_2$ have been loaded in step S16 and have been stored in the next-highest layer of the pyramidal data structure in the pattern data store 134, and step S14 is performed again, the pattern data of the higher-resolution instance $TI_2$ of the texture are used to render the part of the image occupied by the triangular polygon. In this case, the pattern data from different instance coordinates $(p_2,q_2)$ of the higher-resolution instance of the texture are assigned to each of the cells of the reference buffer. For example, the pattern data from three different instance coordinates (64, 32), (64, 33) and (65, 33) in the instance $TI_2$ of the texture are assigned to the three adjacent cells of the reference buffer to which the texture coordinates (512, 256), (512, 264) and (520, 264) were assigned. Since the color values of every pixel of the polygon are generated using pattern data read from different coordinates of the instance $TI_2$ of the texture, when the image is displayed a second time using at least part of the pattern data of the instance $TI_2$, the part of the image corresponding to the polygon is rendered with optimum resolution. There is no need to load the pattern data of any higher resolution instance of the texture to render this part of the image with optimum resolution.

In the example shown in FIG. 16A, the isosceles, right-angled triangular polygon onto which the triangular portion TRI of the texture is being pasted is approximately four times the size of the triangular polygon in the example described above with reference to FIG. 14A. The equal sides of the triangular polygon have lengths equivalent to 65 pixels of the rendering screen. The larger size of the polygon could be the result of the object surface being located relatively close to the view point, for example. Again, in step S10 of the main routine, all of the pattern data of the lowest-resolution instance $TI_1$ of the texture are initially loaded from the server 110 and are stored in the appropriate part of the pyramidal data structure in the pattern data store 134 in the texture's page 132 of the texture data memory 130. Then, in step S13 of the main routine, the texture coordinates (p,q) corresponding to the triangular portion TRI of the texture are allocated to the respective cells in the portion of the reference buffer 126 corresponding to the location of the polygon in the rendering screen. Because the size of the triangular portion of the texture is a factor of four larger than that of the polygon, the allocation process allocates one of every four texture coordinates in both the horizontal and vertical directions to the cells of the reference buffer. As a result, the texture coordinates differ by four between any two cells in either the horizontal and vertical directions, as shown in FIG. 16A.

FIG. 16B shows how the texture coordinates (p,q) stored in the cells of the reference buffer 126 correspond to the instance coordinates $(p_1,q_1)$ in the lowest-resolution instance of the texture $TI_1$, the instance coordinates $(p_2,q_2)$ in the instance $TI_2$ of the texture, and the instance coordinates $(p_3,q_3)$ in the instance $TI_3$ of the texture. In the instance $T_3$ of the texture, the instance coordinates $(p_3,q_3)$ can have 256 discrete values in both the horizontal and vertical directions. When the instance coordinates in the instances $TI_1$ and $TI_2$ of the texture are assigned to the corresponding cells of the reference buffer, some of the instance coordinates $(p_1,q_1)$ and $(p_2,q_2)$, respectively, of the instance are assigned to more than one of the cells of the reference buffer. Thus, when the image is displayed the first and second times using the pattern data of the instances $TI_1$ and $TI_2$ of the texture, the color values of some of the pixels of the rendering screen are generated from the same item of pattern data. As a result, the portion of the image corresponding to the triangular polygon is rendered with sub-optimum resolution.

However, when the image is rendered using the pattern data of the higher-resolution instance $TI_3$ of the texture, the pattern data from different instance coordinates $(p_3,q_3)$ of the higher-resolution instance of the texture are assigned to each of the cells of the reference buffer, as shown in FIG. 16B. Since different instance coordinates of the instance $TI_3$ of the texture are allocated to every pixel of the triangular polygon, when the image is displayed a third time using at least part of the pattern data of the instance $TI_3$, the part of the image corresponding to the polygon is rendered with optimum resolution. There is no need to load the pattern data of any higher resolution instance of the texture to render this part of the image with optimum resolution.

If the triangular portion TRI of the texture is pasted onto triangular polygons having twice the size and four times the size of the polygon described above with reference to FIG. 16A, the texture coordinates (p,q) are allocated in steps of two and steps of one, respectively, in both the horizontal and vertical directions to the cells in the reference buffer 126 corresponding to the location of the polygon in the rendering screen. The progressively-higher resolution instances $TI_1$, $TI_2$, $TI_3$ and $TI_4$, and $TI_1$, $TI_2$, $TI_3$, $TI_4$, and $TI_1$, respectively, of the texture are then used to render the portion of the image in which the polygon is located. The image is displayed with progressively-increasing resolutions and is ultimately displayed with optimum resolution.

Example 2

Next, an example will be described in which a texture representing an image of a map of the world is pasted on the surface of a sphere and an image of the resulting three-dimensional object representing the earth is rendered and displayed. This description will refer to FIGS. 17 through 20 and 21 through 24.

In this example, the surface of the sphere is defined by polygons (not shown). The higher-resolution instances of the texture are pasted onto those of the polygons whose orientations are parallel or nearly parallel to the rendering screen, and the lower-resolution instances of the texture are pasted onto those of the polygons whose orientations are nearly perpendicular to the rendering screen. In addition, when the position of the sphere in the 3D space is changed so that the apparent size of the sphere is increased, more of the higher-resolution instances of the textures are used to render the image. When the apparent size of the sphere is reduced, more of the lower-resolution instances of the texture are used to render the image.

In this example, the four instances $TI_1$, $TI_2$, $TI_3$, and $TI_4$ of a texture represent a map of the world with four levels of resolution, as shown in FIGS. 17 through 20. The texture data of these instances are stored in the texture data memory 114 in the server 110 shown in FIG. 1 as a single texture data file in FLASHPIX format. Polygon data representing the surface of a sphere onto which the texture will be pasted are stored in the polygon data memory 112 in the server.

In this example, the texture representing the map of the world is not square, but has an aspect ratio (horizontal/vertical) of 2:1. Consequently, each of instances $TI_1$, $TI_2$, $TI_3$, and $TI_4$ has an aspect ratio of 2:1. The highest-resolution instance $TI_4$ of the texture has a resolution equal to that of the original texture. The linear resolution of each of the instances $TI_3$, $TI_2$, and $TI_1$ of the texture is one-half of that of the next-higher resolution instance and twice that of the next-lower resolution instance, as described above.

Figure 20:
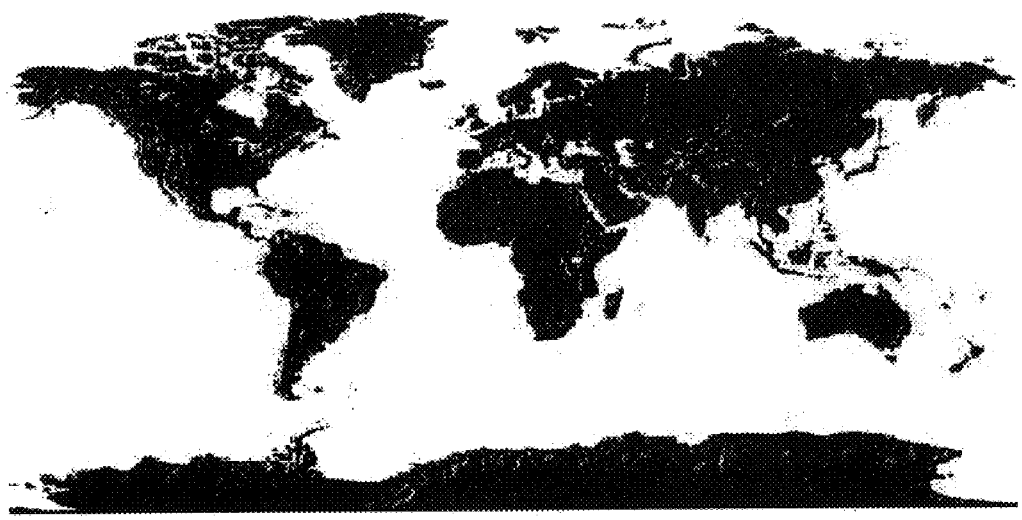

The highest-resolution instance $TI_4$ of the texture is shown in FIG. 20 and is composed of 512 texture pixels in the horizontal direction and 256 texture pixels in the vertical direction. In this example, each instance of the texture is divided into tiles each composed of 64×64 texture pixels. The highest-resolution instance $TI_4$ is divided into a total of 32 tiles, numbered T(11), T(12), . . . , T(42), arranged in a rectangular array of eight tiles in the horizontal direction by four tiles in the vertical direction.

Figure 19:
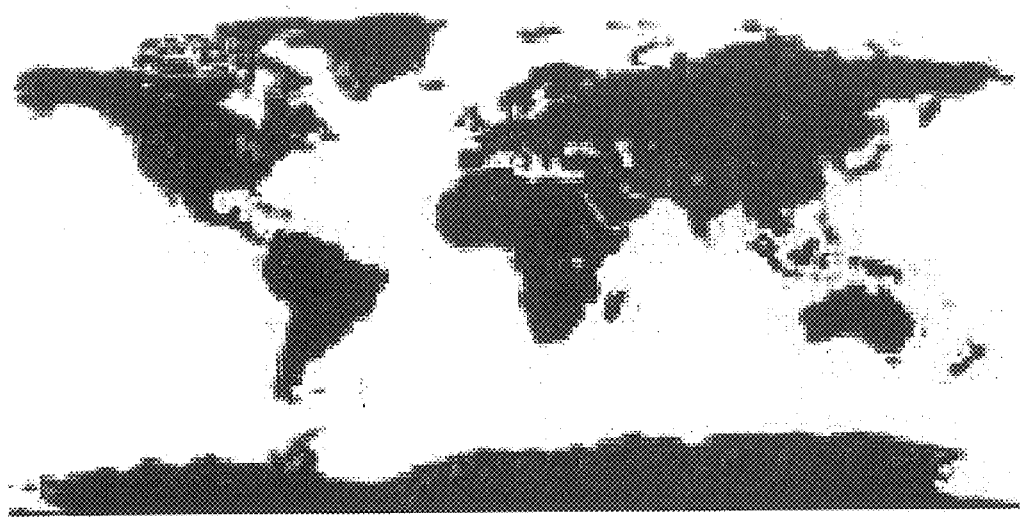

The instance $TI_3$ of the texture is shown in FIG. 19 and is composed of 256 texture pixels in the horizontal direction and 128 texture pixels in the vertical direction. This instance is divided into a total of eight tiles, numbered T(3), T(4), . . . , T(10), arranged in a rectangular array of four tiles in the horizontal direction by two tiles in the vertical direction.

Figure 18:
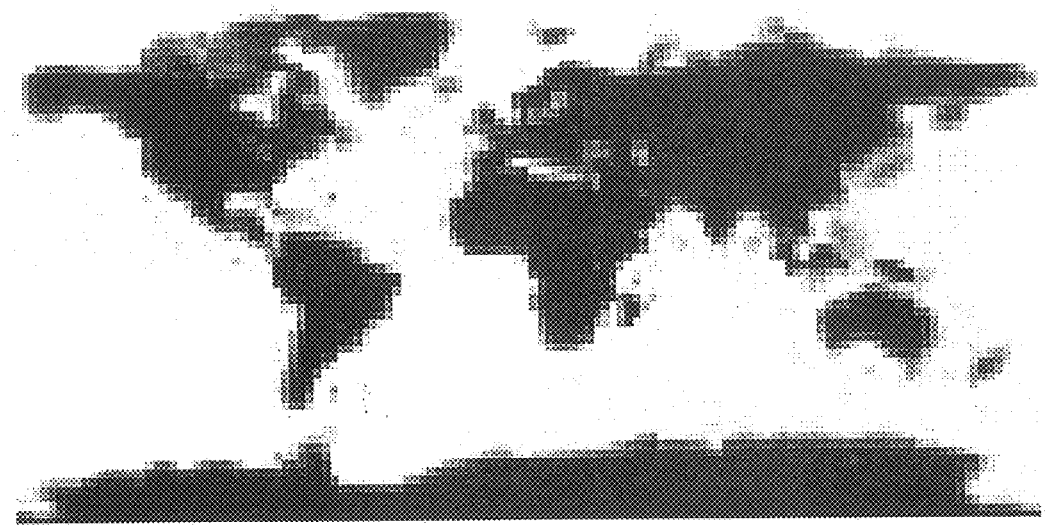

The instance $TI_2$ of the texture is shown in FIG. 18 and is composed of 128 texture pixels in the horizontal direction and 64 texture pixels in the vertical direction. This instance is divided into a total of two tiles, numbered T(1) and T(2), arranged in a rectangular array of two tiles in the horizontal direction by one tile in the vertical direction.

Figure 17:
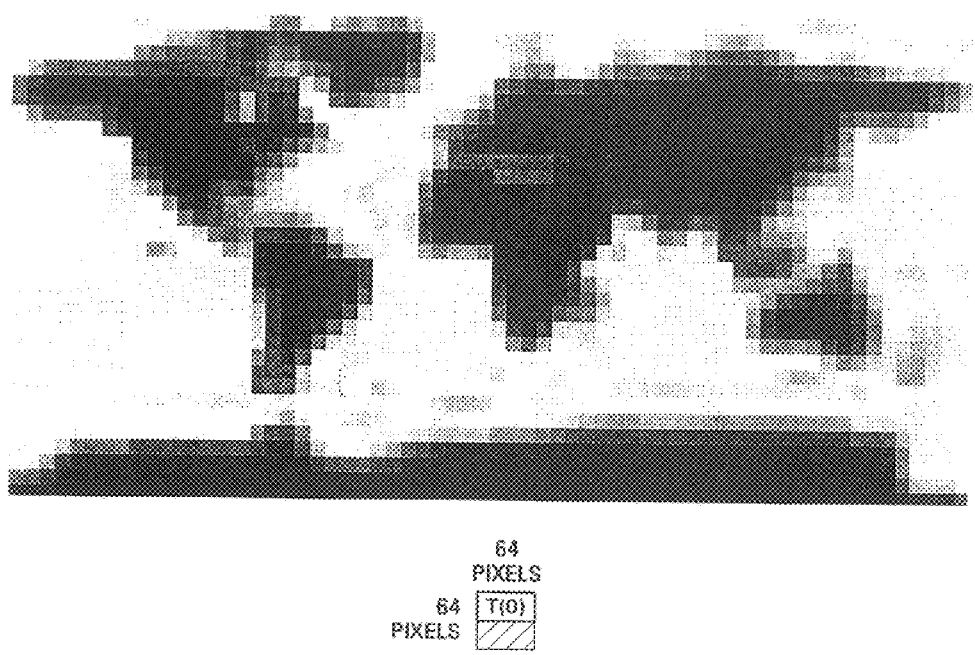
FIGS. 17–20 show four different instances of a texture representing a map of the world, and additionally show the tiles into which each instance is divided, and the tiles whose pattern data are actually used to render the images shown in FIGS. 21–24. The instance shown in FIG. 17 has the lowest resolution, and that shown in FIG. 20 has the highest resolution.

The instance $TI_1$ of the texture is shown in FIG. 17 and is composed of 64 texture pixels in the horizontal direction and 32 texture pixels in the vertical direction. This instance is divided into a single tile numbered T(0). Since the instance $TI_1$ is composed of 64 texture pixels in the horizontal direction and 32 texture pixels in the vertical direction, and the tiles are composed of 64 texture pixels in the horizontal direction and 64 tiles in the vertical direction, this instance of the texture is located in only the top half or the bottom half of the tile. In the example shown, the instance $TI_1$ is located only in the top half of the tile T(0).

FIGS. 21 to 24 show the images displayed when the textures are applied to the sphere to render the images.

Figure 21:
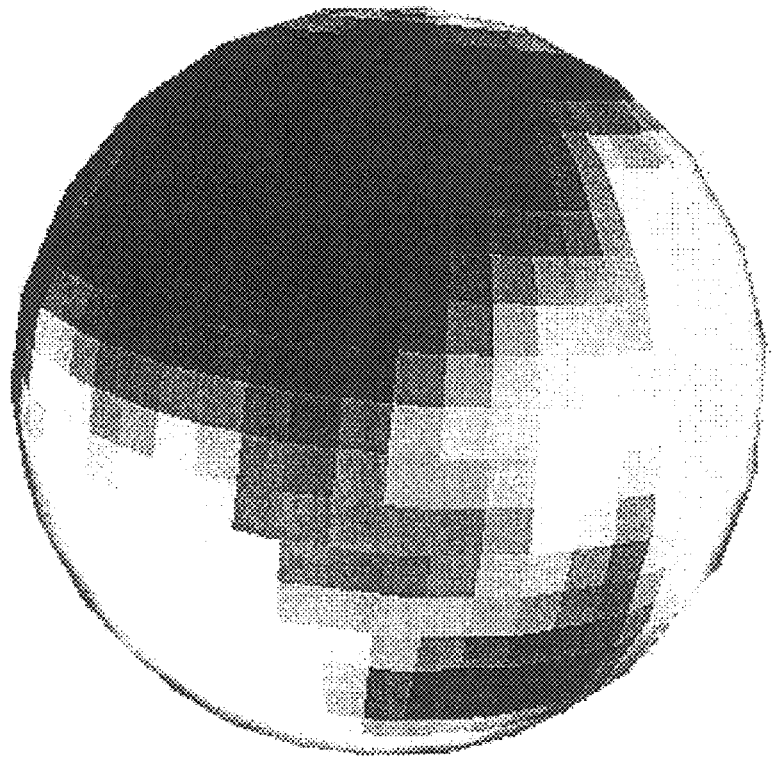
FIGS. 21–24 show examples of the images successively displayed in response to the color values generated by the rendering apparatus and method according to the invention when at least parts of the instances shown in FIGS. 17–20 of the texture are successively pasted onto the surface of a sphere.

FIG. 21 shows an image of the earth rendered using the pattern data of the lowest-resolution instance $TI_1$ of the texture. As described above, the pattern data of the lowest-resolution instance $TI_1$ of the texture, namely, the pattern data of the tile T(0), are loaded from the texture data memory 114 of the server 110, and are stored in the next to highest level in the pyramidal data structure in the pattern data memory 134 in the page 132 of the texture data memory 130 corresponding to the texture.

Figure 22:
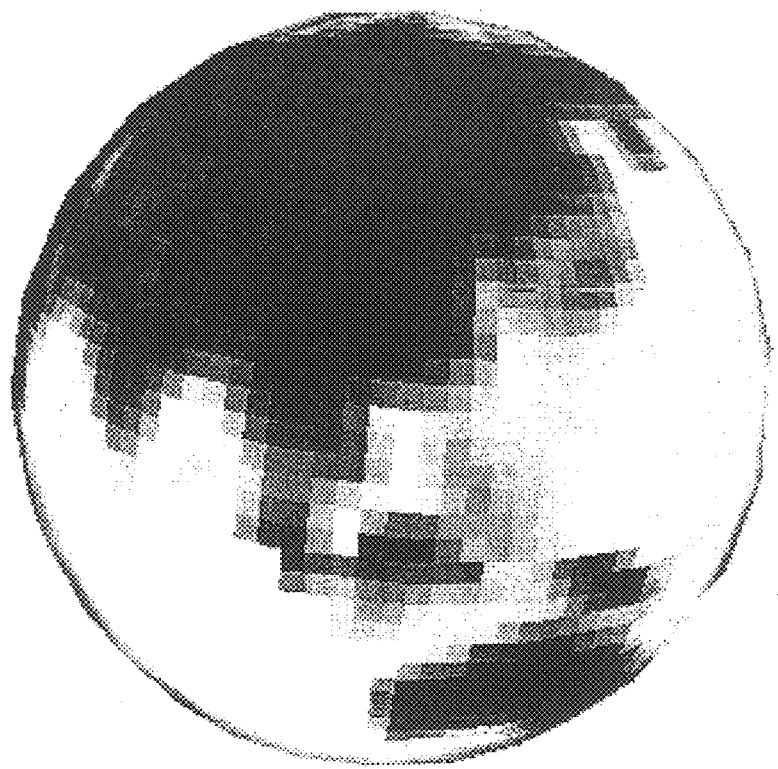

When the image is rendered for the first time using only the pattern data of the instance $TI_1$ of the texture, the resolution of the image is inadequate. Consequently, the pattern data required to render the image a second time using the pattern data of the next-higher resolution instance $TI_2$ of the texture are loaded in units of tiles and are stored in the appropriate locations in the pyramidal data structure referred to above. FIG. 22 shows an image of the earth rendered using the pattern data of the instance $TI_2$ of the texture. In this case, the instance $TI_2$ of the texture is composed of two tiles. Since the rendered parts of the texture image require the pattern data of the tile T(2), the pattern data of this tile are downloaded. The pattern data of the tile T(1) are not downloaded since these data are not required to render the image. The part of the sphere to which the pattern data of the tile T(1) would be applied is not visible from the view point.

When the image is rendered a second time using the pattern data of the instance $TI_2$ of the texture, the resolution of the image is still inadequate. Consequently, the pattern data of the tiles of the next-higher resolution instance $TI_3$ of the texture that are required to render the image a third time with higher resolution are loaded in units of tiles and are stored in the third level of the pyramidal data structure referred to above.

Figure 23:
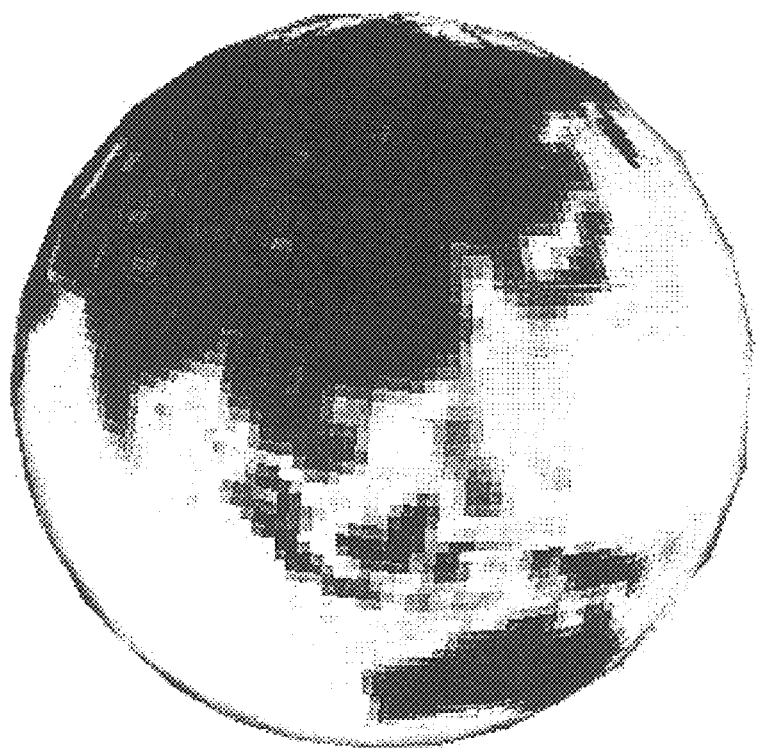

FIG. 23 shows an image of the earth rendered using the pattern data of the instance $TI_3$ of the texture. In this case, the instance $TI_3$ of the texture is composed of eight tiles. However, as indicated by the bold frame in FIG. 19, the pattern data of only four of these tiles, namely, the tiles T(5), T(6), T(9), and T(10), are required to render the image. Consequently, the pattern data of only these four tiles are loaded. The remaining tiles, namely, the tiles T(3), T(4), T(7) and T(10), constituting the instance $TI_3$ of the texture include pattern data that would be applied to the parts of the sphere that are not visible from the view point. Since the pattern data of these tiles are not needed to render the image of the earth, they are not downloaded.

FIG. 19 shows that, in contrast to the pattern data of eight tiles needed conventionally, the rendering apparatus according to the invention loads the pattern data of only the four tiles to render the image and can therefore render the image more quickly than a conventional rendering apparatus.

Figure 24:
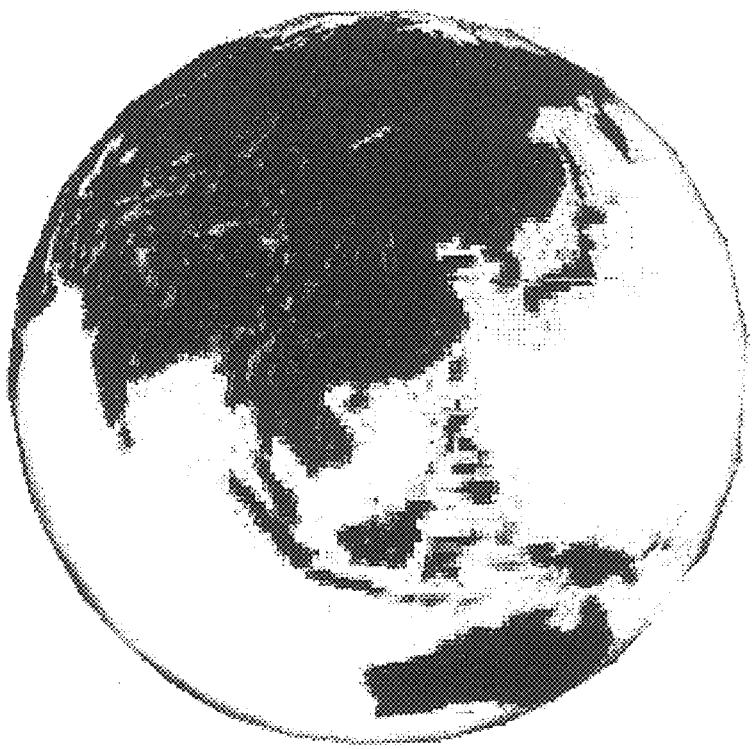

When the image is rendered the third time using the pattern data of the instance $TI_3$ of the texture, the part of the image representing the periphery of the sphere is rendered with optimum resolution. However, the resolution with which the part of the image representing the central part of the sphere is rendered is still inadequate. Therefore, the pattern data of certain tiles of the highest-resolution instance $TI_4$ of the texture are loaded from the texture data memory 114 of the server 110 and are stored in the lowest level of the pyramidal data structure in the pattern data store 134 in the page 132 of the texture data memory 130 corresponding to the texture. FIG. 24 shows an image of the earth rendered using the pattern data of the instances $TI_3$ and $TI_4$ of the texture.

The instance $TI_4$ of the texture is composed of 32 tiles. However, as indicated by the bold frame in FIG. 20, the pattern data of only eight of these tiles, namely, the tiles T(16), T(17), T(24), T(25), T(26), T(32), T(33) and T(34), are required to render the image. Consequently, the pattern data of only these eight tiles are loaded. The pattern data of the remaining tiles constituting the instance $TI_4$ of the texture are not needed to render the image and are therefore not loaded. FIG. 20 shows that, in contrast to the 32 tiles needed conventionally, the rendering apparatus according to the invention loads only eight tiles to render the image and can therefore render the image more quickly than a conventional rendering apparatus.

In the rendering apparatus according to the invention, as the resolution of the rendered image increases, the ratio between the number of pattern data needed to render the image and the total number of pattern data representing the texture reduces. This significantly speeds up rendering the image with optimum resolution compared with a conventional rendering apparatus in which all the pattern data have to be loaded.

In the example described above, the instances $TI_1$, $TI_2$, $TI_3$, and $TI_4$ of the texture having four levels of resolution are used to render the image of the earth. The image of the earth is first displayed at a low resolution. Images with gradually increasing resolution are then sequentially displayed. However, in the images rendered using the pattern data of the higher-resolution instances of the texture, parts of the image may be rendered with optimum resolution using the pattern data of some of the lower-resolution instances of the texture. This may further reduce the number of pattern data of the higher-resolution instances that have to loaded.

In a conventional rendering apparatus, since the rendering calculations are not begun until after all the texture data have been loaded, including pattern data equivalent to all of the tiles forming the highest-resolution instance $TI_4$ of the texture, a long time elapses before an image of the 3D object, the earth in this example, is first displayed. If the example just described were rendered using a conventional rendering apparatus, the number of pattern data that would have to be loaded before the rendering calculations start would be 32×64×64=131,062. In contrast, in the rendering apparatus according to the invention, first, only the pattern data of one tile are initially loaded into the texture data memory 130 in the client computer 102 from the texture data memory 114 in the server 110. Therefore, the time that elapses between starting to load the 3D graphics data and the time that a first image of the 3D object is displayed is significantly shorter. The user can almost immediately see an image of the 3D object at the resolution of the lowest-resolution instance $TI_1$ of the texture. Moreover, when the rendering apparatus according to the invention is used to render the image of the earth in the example just described, the number of pattern data loaded from the server is no more than the number of pattern data in a total of 14 tiles of the instances $TI_1$ to $TI_4$ of the texture. Therefore, the number of pattern data that the rendering apparatus according to the invention loads from the server is significantly smaller than the pattern data of 32 tiles required by the conventional rendering apparatus. The loading time and network usage by the system according to the invention are significantly less.

The invention enables an image of a 3D object whose surface appearance is defined by a texture to be rendered at high speed and with an optimum resolution. The invention renders an initial, low-resolution image of the object with essentially no waiting time. In particular, when image of a 3D object is rendered in a network environment, the image can be initially displayed at a low resolution and then re-displayed at gradually higher resolutions. Furthermore, by loading the pattern data of only those tiles of each instance of the texture actually required to render the image, various resources, such as network resources, can be used more effectively.

Although this disclosure describes illustrative embodiments of the invention in detail, it is to be understood that the invention is not limited to the precise embodiments described, and that various modifications may be practiced within the scope of the invention defined by the appended claims.

I claim:

1. Rendering apparatus for rendering an image in response to three-dimensional graphics data, the apparatus comprising:

a path through which the rendering apparatus receives the three-dimensional graphics data, the three-dimensional graphics data including polygon data and texture data, the texture data defining a texture and including texture size data and pattern data, the pattern data representing instances of the texture, each of the instances having a different resolution and including a lowest-resolution instance and a highest-resolution instance, the pattern data constituting a majority of the texture data, the apparatus initially receiving via the path no more than the polygon data, the texture size data and ones of the pattern data representing the lowest-resolution instance of the texture;

a reference buffer including memory cells corresponding to pixels of a rendering screen; and a rendering engine that performs an initial rasterizing operation using only the polygon and texture size data to generate and to store in each of the memory cells of the reference buffer texture coordinates for a corresponding one of the pixels of the rendering screen, and that repetitively performs a display-and-load operation in which the rendering engine:

generates color values representing the image using the pattern data of a highest-resolution one of the instances of the texture extant in the rendering apparatus, identifies, in response to the texture coordinates stored in the reference buffer, ones of the pattern data of a next-higher resolution instance of the texture required to render at least parts of the image with a higher resolution, and causes the ones of the pattern data identified as being required to render the at least parts of the image with the higher resolution to be loaded via the path, the rendering engine repetitively performing the display-and-load operation until one of (a) the color values of all the pixels of the rendering screen are generated using different ones of the pattern data extant in the rendering apparatus, and (b) ones of the pattern data representing at least part of the highest-resolution instance of the texture have been loaded.

2. The rendering apparatus of claim 1, in which:

the initial rasterizing operation performed by the rendering engine additionally generates intensity coefficients for the one of the pixels of the rendering screen; and the intensity coefficients are additionally stored in a one of the memory cells of the reference buffer corresponding to the one of the pixels of the rendering screen.

3. The rendering apparatus of claim 2, additionally comprising a texture memory in which the pattern data loaded via the path are stored in a pyramidal data structure, the pyramidal data structure including layers in which are stored the pattern data of respective ones of the instances of the texture.

4. The rendering apparatus of claim 3, in which:

the pattern data belong to texture pixels arrayed in rectangular tiles;

the texture memory additionally includes a tile load list for the texture, the tile load list including an entry for each of the tiles; and when the rendering engine identifies the ones of the pattern data of the next-higher resolution instance of the texture, the rendering engine:

detects ones of the tiles that include ones of the texture pixels whose pattern data were used by the rendering engine to generate the color values of the more than one nearby pixel of the rendering screen; and sets to a load state the entry in the tile load list for each one of the tiles located in the next-higher resolution instance of the texture in a position corresponding to the ones of the texture pixels whose pattern data were used to generate the color values of the more than one nearby pixel of the rendering screen, the load state indicating that the pattern data of the one of the tiles of the next-higher resolution instance are required to render the image with the higher resolution.

5. The rendering apparatus of claim 4, in which, when the rendering engine causes to be loaded the ones of the pattern data identified as being required, the rendering engine:

tests the tile load list for the texture to identify the entries set to the load state;

causes to be loaded via the path the pattern data of the tiles whose entries in the tile load list are identified as being set to the load state; and changes the entry in the tile load list for the tiles whose pattern data have been loaded from the load state to a loaded state, the loaded state indicating that the pattern data for the tiles have been loaded.

6. The rendering apparatus of claim 4, in which:

the rendering apparatus additionally includes an access map for each one of the tiles whose pattern data exist in the rendering apparatus, the access map including an entry for each one of the texture pixels of the one of the tiles, the entry being initialized to a first state; and when the rendering engine detects the ones of the tiles that include the ones of the texture pixels whose pattern data were used to generate the color values of the more than one nearby pixel of the rendering screen, the rendering engine tests whether the access map entry for each one of the texture pixels whose pattern data were used by the rendering engine to generate the color values is in a second state before setting the entry for the one of the texture pixels to the second state, a test result of the access map entry being in the second state indicating that the pattern data of the one of the texture pixels were used to generate the color values of the more than one nearby pixel of the rendering screen.

7. A method of rendering an image in response to three-dimensional graphics data, the image being represented by color values corresponding to pixels of a rendering screen, the three-dimensional graphics data including polygon data and additionally including texture data defining a texture, the texture data including texture size data and pattern data, the pattern data representing instances of the texture each of the instances having a different resolution and including a lowest-resolution instance and a highest-resolution instance, the pattern data constituting a majority of the texture data, the method comprising:

loading the polygon data, the texture size data and the pattern data representing the lowest-resolution instance of the texture;

performing an initial rasterizing operation using the polygon and texture size data to generate and to store a texture identifier and texture coordinates for each one of the pixels of the rendering screen; and repetitively performing a display-and-load operation, the display-and-load operation, including:
generating the color values representing the image using the pattern data of a highest-resolution instance of the texture previously loaded,
in response to the texture coordinates stored for the rendering screen pixels, identifying ones of the pattern data of a next-higher resolution instance of the texture required to render at least parts of the image with a higher resolution, and
loading the ones of the pattern data identified as being required to render the at least parts of the image with the higher resolution,
the display-and-load operation being repetitively performed until one of (a) the color values of all the pixels of the rendering screen are generated using different ones of the pattern data, and (b) the pattern data of at least part of the highest-resolution instance of the texture have been loaded.

8. The image rendering method of claim 7, in which:
the initial rasterizing operation additionally generates intensity coefficients for the one of the pixels of the rendering screen;
the method additionally comprises storing the intensity coefficients together with the texture identifier and texture coordinates for the one of the pixels of the rendering screen.

9. The image rendering method of claim 8, in which:
the method additionally comprises providing a texture memory having a pyramidal data structure, the pyramidal data structure including layers in each of which are stored the pattern data representing a different one of the instances of the texture; and
loading the ones of the pattern data includes storing the pattern data in a different one of the layers of the pyramidal data structure of the texture memory.

10. The image rendering method of claim 8, in which:
the pattern data belong to texture pixels arrayed in rectangular tiles;
the method additionally comprises providing a tile load list, the tile load list including an entry for each of the tiles; and
identifying the ones of the pattern data of the next-higher resolution instance of the texture includes:
detecting ones of the tiles that include ones of the texture pixels whose pattern data were used in the most-recently performed generating step to generate the color values of more than one nearby pixel of the rendering screen, and
setting to a load state the entry in the tile load list for each one of the tiles located in the next-higher resolution instance of the texture in a position corresponding to the ones of the texture pixels whose pattern data were used to generate the color values of the more than one nearby pixel of the rendering screen, the load state indicating that the pattern data of the one of the tiles of the next-higher resolution instance of the texture are required to render the image with the higher resolution.

11. The image rendering method of claim 10, in which loading the pattern data identified as being required includes:
testing the tile load list to identify the entries set to the load state;
loading the pattern data of the tiles whose entries in the tile load list are identified as being set to the load state; and
changing the entries in the tile load list for the tiles whose pattern data were loaded in the loading step from the load state to a loaded state, the loaded state indicating that the pattern data of the tiles have been loaded.

12. The image rendering method of claim 10, in which:
the method additionally includes providing an access map for each one of the tiles whose pattern data have been loaded, the access map including an entry for each one of the texture pixels of the one of the tiles, the entry being initialized to a first state; and
detecting the ones of the tiles includes:
testing whether the access map entry for each one of the texture pixels whose pattern data were used in the most-recently performed generating step to generate the color values is in a second state, the second state indicating that the pattern data of the one of the texture pixels were used to generate the color values of the more than one nearby pixel of the rendering screen, and
setting the access map entry for the one of the texture pixels to the second state after the testing step has been performed.

13. The image rendering method of claim 10, in which generating the color values includes:
calculating instance coordinates from the texture coordinates for the one of the pixels of the rendering screen, the instance coordinates relating to the highest-resolution instance of the texture whose pattern data were loaded in the most-recently performed loading step;
calculating a tile number and tile coordinates from the instance coordinates;
reading the pattern data stored at an address indicated by the tile number and the tile coordinates; and
multiplying the pattern data read in the reading step by the intensity coefficients of the pixel to generate the color values.

14. The rendering apparatus of claim 1, additionally comprising a texture memory in which the pattern data loaded via the path are stored in a pyramidal data structure, the pyramidal data structure including layers in which are stored the pattern data of respective ones of the instances of the texture.

15. The rendering apparatus of claim 14, in which:
the pattern data belong to texture pixels arrayed in rectangular tiles;
the texture memory additionally includes a tile load list for the texture, the tile load list including an entry for each of the tiles; and
when the rendering engine identifies the ones of the pattern data of the next-higher resolution instance of the texture, the rendering engine:
detects ones of the tiles that include ones of the texture pixels whose pattern data were used by the rendering engine to generate the color values of the more than one nearby pixel of the rendering screen; and
sets to a load state the entry in the tile load list for each one of the tiles located in the next-higher resolution instance of the texture in a position corresponding to the ones of the texture pixels whose pattern data were used to generate the color values of the more than one nearby pixel of the rendering screen, the load state indicating that the pattern data of the one of the tiles of the next-higher resolution instance are required to render the image with the higher resolution.

16. The image rendering method of claim 7, in which:

the method additionally comprises providing a texture memory having a pyramidal data structure, the pyramidal data structure including layers in each of which are stored the pattern data representing a different one of the instances of the texture; and loading the ones of the pattern data includes storing the pattern data in a different one of the layers of the pyramidal data structure of the texture memory.

17. The image rendering method of claim 7, in which:

the pattern data belong to texture pixels arrayed in rectangular tiles;

the method additionally comprises providing a tile load list, the tile load list including an entry for each of the tiles; and identifying the ones of the pattern data of the next-higher resolution instance of the texture includes:

detecting ones of the tiles that include ones of the texture pixels whose pattern data were used in the most-recently performed generating step to generate the color values of more than one nearby pixel of the rendering screen, and setting to a load state the entry in the tile load list for each one of the tiles located in the next-higher resolution instance of the texture in a position corresponding to the ones of the texture pixels whose pattern data were used to generate the color values of the more than one nearby pixel of the rendering screen, the load state indicating that the pattern data of the one of the tiles of the next-higher resolution instance of the texture are required to render the image with the higher resolution.

18. The image rendering method of claim 17, in which loading the pattern data identified as being required includes:

testing the tile load list to identify the entries set to the load state;

loading the pattern data of the tiles whose entries in the tile load list are identified as being set to the load state; and changing the entries in the tile load list for the tiles whose pattern data were loaded in the loading step from the load state to a loaded state, the loaded state indicating that the pattern data of the tiles have been loaded.

19. The image rendering method of claim 18, in which:

the method additionally includes providing an access map for each one of the tiles whose pattern data have been loaded, the access map including an entry for each one of the texture pixels of the one of the tiles, the entry being initialized to a first state; and detecting the ones of the tiles includes:

testing whether the access map entry for each one of the texture pixels whose pattern data were used in the most-recently performed generating step to generate the color values is in a second state, the second state indicating that the pattern data of the one of the texture pixels were used to generate the color values of the more than one nearby pixel of the rendering screen, and setting the access map entry for the one of the texture pixels to the second state after the testing step has been performed.

20. The image rendering method of claim 18, in which generating the color values includes:

calculating instance coordinates from the texture coordinates for the one of the pixels of the rendering screen, the instance coordinates relating to the highest-resolution instance of the texture whose pattern data were loaded in the most-recently performed loading step;

calculating a tile number and tile coordinates from the instance coordinates;

reading the pattern data stored at an address indicated by the tile number and the tile coordinates; and multiplying the pattern data read in the reading step by the intensity coefficients of the pixel to generate the color values.

* * * * *